(12) United States Patent
Sanchez

(10) Patent No.: US 12,504,784 B1
(45) Date of Patent: Dec. 23, 2025

(54) SMART RING CLIP AND METHOD OF MANUFACTURE

(71) Applicant: QUANATA, LLC, San Francisco, CA (US)

(72) Inventor: Kenneth Jason Sanchez, San Francisco, CA (US)

(73) Assignee: QUANATA, LLC, San Francisco, CA (US)

( * ) Notice: Subject to any disclaimer, the term of this patent is extended or adjusted under 35 U.S.C. 154(b) by 1090 days.

(21) Appl. No.: 16/927,402

(22) Filed: Jul. 13, 2020

Related U.S. Application Data

(60) Provisional application No. 62/986,905, filed on Mar. 9, 2020, provisional application No. 62/877,391, filed on Jul. 23, 2019.

(51) Int. Cl.
| | | |
|---|---|---|
| *G06F 1/16* | (2006.01) | |
| *B33Y 50/00* | (2015.01) | |
| *B33Y 80/00* | (2015.01) | |
| *G06F 3/01* | (2006.01) | |

(Continued)

(52) U.S. Cl.
CPC .............. *G06F 1/163* (2013.01); *B33Y 50/00* (2014.12); *B33Y 80/00* (2014.12); *G06F 3/014* (2013.01); *H04N 1/00233* (2013.01); *H04N 1/00278* (2013.01); *H04N 1/00827* (2013.01); *H04N 2201/0081* (2013.01); *H04W 4/80* (2018.02)

(58) Field of Classification Search
CPC . G06F 1/163; G06F 3/014; G06F 1/16; G06F 2203/0331; B33Y 50/00; B33Y 80/00; H04N 1/00233; H04N 1/00278; H04N 1/00827; H04N 2201/0081; H04W 4/80; H04W 12/33; G01P 15/003
See application file for complete search history.

(56) References Cited

U.S. PATENT DOCUMENTS

| 513,344 A | 1/1894 | Smith |
| 2,737,192 A | 3/1956 | Bieler |
| 3,792,192 A | 2/1974 | Plate |

(Continued)

FOREIGN PATENT DOCUMENTS

| AU | 2017324615 A1 | 2/2019 |
| CN | 103109462 A | 5/2013 |

(Continued)

OTHER PUBLICATIONS https://en.wikipedia.org/w/index.php?title=Ring_size&oldid=891328817 (Year: 2019).

(Continued)

*Primary Examiner* — Allen L Parker
*Assistant Examiner* — Martin Antonio Asmat Uceda
(74) *Attorney, Agent, or Firm* — BRYAN CAVE LEIGHTON PAISNER LLP

(57) ABSTRACT

A smart ring clip includes a body with a groove for receiving a portion of a ring, the ring contacting the body, and the body including a flexible material. One or more of a battery, a charging unit, a processing unit, a user input unit, a communication unit, a memory unit, at least one sensor unit, and an output unit is one of attached to or disposed within the body. The body is secured, such as clipped, to the ring by the groove and is removable from the ring upon movement of the body in a direction away from the ring.

24 Claims, 7 Drawing Sheets

(51) Int. Cl.
*H04N 1/00* (2006.01)
*H04W 4/80* (2018.01)

(56) References Cited

U.S. PATENT DOCUMENTS

| | | | |
|---|---|---|---|
| 4,012,629 A | 3/1977 | Simms | |
| 4,382,112 A | 5/1983 | Betts et al. | |
| 4,684,687 A | 8/1987 | Breach et al. | |
| 4,830,014 A | 5/1989 | Goodman et al. | |
| 4,880,304 A | 11/1989 | Jaeb et al. | |
| 5,135,220 A | 8/1992 | Baldoni | |
| 6,097,480 A | 8/2000 | Kaplan | |
| 6,154,658 A | 11/2000 | Caci | |
| 6,201,698 B1 | 3/2001 | Hunter | |
| 6,560,993 B1* | 5/2003 | Bosque | A44C 5/0092 63/3 |
| 6,608,562 B1 | 8/2003 | Kimura et al. | |
| 6,699,199 B2 | 3/2004 | Asada et al. | |
| 6,745,061 B1 | 6/2004 | Hicks et al. | |
| 6,792,044 B2 | 9/2004 | Peng et al. | |
| 6,800,693 B2 | 10/2004 | Nishihara et al. | |
| 6,803,391 B2 | 10/2004 | Paglia et al. | |
| 6,805,140 B2 | 10/2004 | Velez, Jr. et al. | |
| 6,894,628 B2 | 5/2005 | Marpe et al. | |
| 6,909,753 B2 | 6/2005 | Meehan et al. | |
| 6,959,116 B2 | 10/2005 | Sezer et al. | |
| 7,013,674 B2* | 3/2006 | Kretchmer | A44C 9/02 63/15.7 |
| 7,136,532 B2 | 11/2006 | VanDer | |
| 7,190,986 B1 | 3/2007 | Hannula et al. | |
| 7,227,894 B2 | 6/2007 | Lin et al. | |
| 7,275,172 B2 | 9/2007 | Janzen et al. | |
| 7,286,710 B2 | 10/2007 | Marpe et al. | |
| 7,468,036 B1 | 12/2008 | Rulkov et al. | |
| 7,500,697 B2* | 3/2009 | Romack | F16B 3/00 285/305 |
| 7,500,746 B1 | 3/2009 | Howell et al. | |
| 7,519,229 B2 | 4/2009 | Wallace et al. | |
| 7,689,437 B1 | 3/2010 | Teller et al. | |
| 7,872,444 B2* | 1/2011 | Hamilton | H02J 50/001 320/108 |
| 8,031,172 B2 | 10/2011 | Kruse et al. | |
| 8,075,484 B2 | 12/2011 | Moore-Ede | |
| 8,345,752 B2 | 1/2013 | Lee et al. | |
| 8,446,275 B2 | 5/2013 | Utter, II | |
| 8,554,297 B2 | 10/2013 | Moon et al. | |
| 8,570,273 B1* | 10/2013 | Smith | G06F 3/03547 345/161 |
| 8,624,554 B2* | 1/2014 | Ajagbe | H02J 7/0042 320/114 |
| 8,700,111 B2 | 4/2014 | Leboeuf et al. | |
| 8,954,135 B2 | 2/2015 | Yuen et al. | |
| 9,218,058 B2 | 12/2015 | Bress et al. | |
| 9,248,839 B1 | 2/2016 | Tan | |
| 9,248,938 B2 | 2/2016 | Hopps | |
| 9,265,310 B2* | 2/2016 | Lam | H04M 1/0254 |
| 9,362,775 B1 | 6/2016 | Jacobs | |
| 9,420,260 B2 | 8/2016 | Mcgregor et al. | |
| 9,440,657 B1 | 9/2016 | Fields et al. | |
| 9,477,146 B2 | 10/2016 | Xu et al. | |
| 9,509,170 B2 | 11/2016 | Wu | |
| 9,628,707 B2 | 4/2017 | Blum et al. | |
| 9,660,488 B2* | 5/2017 | Breedvelt-Schouten | H02J 50/12 |
| 9,696,690 B2 | 7/2017 | Nguyen et al. | |
| 9,711,060 B1 | 7/2017 | Lusted et al. | |
| 9,711,993 B2 | 7/2017 | Kim | |
| 9,717,949 B1 | 8/2017 | Tran et al. | |
| 9,733,700 B2* | 8/2017 | Song | G06F 3/0488 |
| 9,756,301 B2 | 9/2017 | Li et al. | |
| 9,841,331 B2* | 12/2017 | Wood | A61B 5/1036 |
| 9,847,020 B2 | 12/2017 | Davis | |
| 9,861,314 B2* | 1/2018 | Haverinen | A61B 5/6801 |
| 9,880,620 B2* | 1/2018 | Kienzle | G06F 3/0346 |
| 9,908,530 B1 | 3/2018 | Fields et al. | |
| 9,931,976 B1 | 4/2018 | Terwilliger et al. | |
| 9,955,286 B2 | 4/2018 | Segal | |
| 9,956,963 B2 | 5/2018 | Vijaya Kumar et al. | |
| 9,965,761 B2 | 5/2018 | Elangovan et al. | |
| 10,007,355 B2 | 6/2018 | Schorsch et al. | |
| 10,043,125 B2* | 8/2018 | Park | H04M 1/72412 |
| 10,085,695 B2 | 10/2018 | Ouwerkerk et al. | |
| 10,099,608 B2 | 10/2018 | Cuddihy et al. | |
| 10,102,510 B2 | 10/2018 | Yau et al. | |
| 10,137,777 B2 | 11/2018 | Lu et al. | |
| 10,139,859 B2 | 11/2018 | Von Badinski et al. | |
| 10,281,953 B2* | 5/2019 | von Badinski | A61B 5/6806 |
| 10,303,867 B2 | 5/2019 | Schröder | |
| 10,315,557 B2 | 6/2019 | Terwilliger et al. | |
| 10,317,940 B2* | 6/2019 | Eim | G06F 1/163 |
| 10,345,506 B1 | 7/2019 | Lyu | |
| 10,359,846 B2 | 7/2019 | Priyantha et al. | |
| 10,366,220 B2* | 7/2019 | Shapiro | H04W 12/33 |
| 10,377,386 B2 | 8/2019 | Richmond | |
| 10,384,647 B2* | 8/2019 | Tayama | B60R 25/25 |
| 10,396,584 B2 | 8/2019 | Madau et al. | |
| 10,409,327 B2 | 9/2019 | Stotler | |
| 10,444,834 B2* | 10/2019 | Vescovi | G06F 3/0346 |
| 10,463,141 B2 | 11/2019 | Fitzgerald et al. | |
| 10,509,994 B1* | 12/2019 | Huynh | G06K 19/07762 |
| 10,528,989 B1 | 1/2020 | Irey | |
| 10,564,628 B2* | 2/2020 | Hargovan | G06T 19/20 |
| 10,629,175 B2 | 4/2020 | Yan et al. | |
| 10,664,842 B1 | 5/2020 | Bermudez et al. | |
| 10,693,872 B1 | 6/2020 | Larson et al. | |
| 10,701,067 B1 | 6/2020 | Ziraknejad | |
| 10,703,204 B2 | 7/2020 | Hassan et al. | |
| 10,709,339 B1 | 7/2020 | Lusted | |
| 10,745,032 B2 | 8/2020 | Scheggi | |
| 10,762,183 B1 | 9/2020 | Charan et al. | |
| 10,768,666 B2 | 9/2020 | Von Badinski et al. | |
| 10,838,499 B2* | 11/2020 | Wang | G06F 3/0426 |
| 10,842,429 B2 | 11/2020 | Kinnunen et al. | |
| 10,849,557 B2* | 12/2020 | Keating | A61B 5/0205 |
| 10,893,833 B2* | 1/2021 | Haverinen | A61B 5/6801 |
| 10,944,745 B2 | 3/2021 | Kursun | |
| 11,227,060 B1 | 1/2022 | John et al. | |
| 11,237,640 B2* | 2/2022 | Zhu | G06F 30/00 |
| 11,265,635 B2* | 3/2022 | Shankar | H04M 1/72412 |
| 11,271,290 B2* | 3/2022 | McLear | H01Q 1/273 |
| 11,312,299 B1 | 4/2022 | Assam | |
| 11,479,258 B1 | 10/2022 | Sanchez | |
| 11,599,147 B2 | 3/2023 | Von Badinski et al. | |
| 11,601,424 B2* | 3/2023 | Fukuda | G06F 1/163 |
| 11,637,511 B2 | 4/2023 | Sanchez | |
| 11,714,494 B2* | 8/2023 | D'Amone | G06F 3/0362 345/156 |
| 11,868,178 B2 | 1/2024 | Von Badinski et al. | |
| 11,868,179 B2 | 1/2024 | Von Badinski et al. | |
| 11,894,704 B2 | 2/2024 | Sanchez | |
| 11,909,238 B1 | 2/2024 | Sanchez | |
| 11,914,780 B2* | 2/2024 | Wang | G06F 3/016 |
| 11,923,791 B2 | 3/2024 | Sanchez | |
| 11,984,742 B2 | 5/2024 | Sanchez | |
| 11,990,954 B2* | 5/2024 | Kato | H04N 23/57 |
| 12,191,692 B2 | 1/2025 | Sanchez | |
| 12,211,467 B2 | 1/2025 | Sanchez | |
| 12,237,700 B2 | 2/2025 | Sanchez et al. | |
| 2002/0042464 A1 | 4/2002 | Barclay et al. | |
| 2002/0091568 A1 | 7/2002 | Kraft et al. | |
| 2002/0121831 A1 | 9/2002 | Egawa et al. | |
| 2003/0077064 A1 | 4/2003 | Katayama | |
| 2003/0142065 A1* | 7/2003 | Pahlavan | G06F 3/0346 345/156 |
| 2004/0102551 A1 | 5/2004 | Sato et al. | |
| 2004/0118592 A1 | 6/2004 | Pehlert | |
| 2004/0145256 A1 | 7/2004 | Miekka | |
| 2004/0160635 A1 | 8/2004 | Ikeda et al. | |
| 2004/0200235 A1 | 10/2004 | Kretchmer | |
| 2005/0012648 A1 | 1/2005 | Marpe et al. | |
| 2005/0030205 A1 | 2/2005 | Konoshima et al. | |
| 2005/0054941 A1 | 3/2005 | Ting et al. | |
| 2005/0062454 A1 | 3/2005 | Raghunath et al. | |
| 2005/0133248 A1 | 6/2005 | Easter | |

(56) References Cited

U.S. PATENT DOCUMENTS

| | | |
|---|---|---|
| 2005/0162523 A1 | 7/2005 | Darrell et al. |
| 2005/0185060 A1 | 8/2005 | Neven. Sr. |
| 2005/0185843 A1 | 8/2005 | Kudoh |
| 2005/0185844 A1 | 8/2005 | Ono et al. |
| 2005/0230596 A1 | 10/2005 | Howell et al. |
| 2006/0002607 A1 | 1/2006 | Boncyk et al. |
| 2006/0069681 A1 | 3/2006 | Lauper |
| 2006/0080286 A1 | 4/2006 | Svendsen |
| 2006/0085477 A1 | 4/2006 | Phillips et al. |
| 2006/0089792 A1 | 4/2006 | Manber et al. |
| 2006/0211924 A1 | 9/2006 | Dalke et al. |
| 2006/0250043 A1 | 11/2006 | Chung |
| 2006/0271593 A1 | 11/2006 | De Mes et al. |
| 2007/0149222 A1 | 6/2007 | Hodko et al. |
| 2007/0159522 A1 | 7/2007 | Neven |
| 2007/0188626 A1 | 8/2007 | Squilla et al. |
| 2007/0200713 A1 | 8/2007 | Weber et al. |
| 2007/0223826 A1 | 9/2007 | Ridge et al. |
| 2008/0068559 A1 | 3/2008 | Howell et al. |
| 2008/0136587 A1 | 6/2008 | Orr |
| 2008/0174676 A1 | 7/2008 | Squilla et al. |
| 2008/0218684 A1 | 9/2008 | Howell et al. |
| 2008/0275309 A1 | 11/2008 | Stivoric et al. |
| 2009/0056703 A1 | 3/2009 | Mills et al. |
| 2010/0219989 A1 | 9/2010 | Asami et al. |
| 2011/0007035 A1* | 1/2011 | Shai ............... G06F 3/0304 |
| | | 345/179 |
| 2011/0080339 A1 | 4/2011 | Sun et al. |
| 2011/0224875 A1 | 9/2011 | Cuddihy et al. |
| 2012/0016245 A1 | 1/2012 | Niwa et al. |
| 2012/0075196 A1* | 3/2012 | Ashbrook ............ H04M 1/233 |
| | | 345/173 |
| 2012/0130203 A1 | 5/2012 | Stergiou et al. |
| 2012/0184367 A1 | 7/2012 | Parrott et al. |
| 2012/0218184 A1 | 8/2012 | Wissmar |
| 2012/0293107 A1 | 11/2012 | Ajagbe |
| 2012/0317024 A1 | 12/2012 | Rahman et al. |
| 2013/0106603 A1 | 5/2013 | Weast et al. |
| 2013/0211291 A1 | 8/2013 | Tran |
| 2013/0335213 A1 | 12/2013 | Sherony et al. |
| 2014/0107493 A1 | 4/2014 | Yuen et al. |
| 2014/0118704 A1 | 5/2014 | Duelli et al. |
| 2014/0120983 A1 | 5/2014 | Lam |
| 2014/0187160 A1 | 7/2014 | Prencipe |
| 2014/0218529 A1 | 8/2014 | Mahmoud et al. |
| 2014/0238153 A1* | 8/2014 | Wood ............... A43B 23/029 |
| | | 73/862.627 |
| 2014/0240132 A1 | 8/2014 | Bychkov |
| 2014/0244009 A1 | 8/2014 | Mestas |
| 2014/0274203 A1 | 9/2014 | Ganong, III |
| 2014/0309849 A1 | 10/2014 | Ricci |
| 2014/0361934 A1 | 12/2014 | Ely et al. |
| 2014/0361945 A1 | 12/2014 | Misra et al. |
| 2015/0003693 A1 | 1/2015 | Baca et al. |
| 2015/0019266 A1 | 1/2015 | Stempora |
| 2015/0028996 A1 | 1/2015 | Agrafioti |
| 2015/0046996 A1 | 2/2015 | Slaby et al. |
| 2015/0062086 A1 | 3/2015 | Nattukallingal |
| 2015/0065090 A1 | 3/2015 | Yeh |
| 2015/0098309 A1 | 4/2015 | Adams |
| 2015/0124096 A1 | 5/2015 | Koravadi |
| 2015/0126824 A1 | 5/2015 | Leboeuf et al. |
| 2015/0133193 A1 | 5/2015 | Stotler |
| 2015/0158499 A1 | 6/2015 | Koravadi |
| 2015/0186092 A1 | 7/2015 | Francis et al. |
| 2015/0220109 A1 | 8/2015 | Von et al. |
| 2015/0277559 A1 | 10/2015 | Vescovi et al. |
| 2015/0338926 A1 | 11/2015 | Park et al. |
| 2015/0352953 A1 | 12/2015 | Koravadi |
| 2016/0028267 A1 | 1/2016 | Lee et al. |
| 2016/0098530 A1 | 4/2016 | Dill et al. |
| 2016/0189149 A1 | 6/2016 | MacLaurin et al. |
| 2016/0192407 A1 | 6/2016 | Fyfe et al. |
| 2016/0226313 A1 | 8/2016 | Okubo |
| 2016/0236692 A1 | 8/2016 | Kleen et al. |
| 2016/0266606 A1* | 9/2016 | Ricci ................. G06F 1/163 |
| 2016/0292563 A1 | 10/2016 | Park |
| 2016/0317060 A1* | 11/2016 | Connor ............... G16H 20/60 |
| 2016/0334901 A1 | 11/2016 | Rihn |
| 2016/0336758 A1 | 11/2016 | Breedvelt-Schouten et al. |
| 2016/0350581 A1 | 12/2016 | Manuel et al. |
| 2016/0361032 A1 | 12/2016 | Carter et al. |
| 2017/0010677 A1 | 1/2017 | Roh et al. |
| 2017/0012925 A1 | 1/2017 | Tekin et al. |
| 2017/0024008 A1 | 1/2017 | Kienzle et al. |
| 2017/0026790 A1 | 1/2017 | Flitsch et al. |
| 2017/0042477 A1* | 2/2017 | Haverinen ........... A61B 5/6826 |
| 2017/0053461 A1 | 2/2017 | Pal et al. |
| 2017/0057492 A1 | 3/2017 | Edgington et al. |
| 2017/0070078 A1 | 3/2017 | Hwang et al. |
| 2017/0075701 A1 | 3/2017 | Ricci et al. |
| 2017/0080952 A1 | 3/2017 | Gupta et al. |
| 2017/0090475 A1 | 3/2017 | Choi et al. |
| 2017/0109512 A1 | 4/2017 | Bower et al. |
| 2017/0129335 A1 | 5/2017 | Lu et al. |
| 2017/0131772 A1 | 5/2017 | Choi |
| 2017/0190121 A1* | 7/2017 | Aggarwal ............ A43D 1/025 |
| 2017/0192530 A1 | 7/2017 | Lee |
| 2017/0242428 A1 | 8/2017 | Pal et al. |
| 2017/0251967 A1 | 9/2017 | Premsukh |
| 2017/0336964 A1 | 11/2017 | Kim |
| 2017/0346635 A1* | 11/2017 | Gummeson ............... G06F 1/16 |
| 2017/0347895 A1 | 12/2017 | Wei et al. |
| 2017/0355377 A1 | 12/2017 | Vijaya Kumar et al. |
| 2017/0374074 A1 | 12/2017 | Stuntebeck |
| 2018/0025351 A1 | 1/2018 | Chen et al. |
| 2018/0025430 A1 | 1/2018 | Perl et al. |
| 2018/0032126 A1 | 2/2018 | Liu |
| 2018/0037228 A1 | 2/2018 | Biondo et al. |
| 2018/0039303 A1 | 2/2018 | Hashimoto et al. |
| 2018/0052428 A1 | 2/2018 | Abramov |
| 2018/0054513 A1 | 2/2018 | Ma |
| 2018/0068105 A1 | 3/2018 | Shapiro et al. |
| 2018/0093606 A1 | 4/2018 | Terwilliger et al. |
| 2018/0093610 A1 | 4/2018 | Sun et al. |
| 2018/0093672 A1 | 4/2018 | Terwilliger et al. |
| 2018/0115797 A1 | 4/2018 | Wexler et al. |
| 2018/0120891 A1* | 5/2018 | Eim ................. H04M 1/0235 |
| 2018/0120892 A1 | 5/2018 | Von et al. |
| 2018/0123629 A1 | 5/2018 | Wetzig |
| 2018/0167200 A1 | 6/2018 | High et al. |
| 2018/0174457 A1 | 6/2018 | Taylor |
| 2018/0178712 A1 | 6/2018 | Terwilliger et al. |
| 2018/0229674 A1 | 8/2018 | Heinrich et al. |
| 2018/0256027 A1 | 9/2018 | Lacher |
| 2018/0257668 A1 | 9/2018 | Tonshal |
| 2018/0262505 A1 | 9/2018 | Ligatti |
| 2018/0292901 A1 | 10/2018 | Priyantha et al. |
| 2018/0300467 A1 | 10/2018 | Kwong et al. |
| 2018/0322957 A1 | 11/2018 | Dill et al. |
| 2019/0004325 A1 | 1/2019 | Connor |
| 2019/0049267 A1 | 2/2019 | Huang |
| 2019/0083022 A1 | 3/2019 | Huang |
| 2019/0131812 A1* | 5/2019 | Lee ................. G06F 3/015 |
| 2019/0155104 A1 | 5/2019 | Li et al. |
| 2019/0155385 A1 | 5/2019 | Lim et al. |
| 2019/0172289 A1 | 6/2019 | O'Toole et al. |
| 2019/0191998 A1 | 6/2019 | Heikenfeld et al. |
| 2019/0213429 A1 | 7/2019 | Sicconi et al. |
| 2019/0230507 A1 | 7/2019 | Li et al. |
| 2019/0265868 A1 | 8/2019 | Penilla et al. |
| 2019/0286805 A1 | 9/2019 | Law et al. |
| 2019/0287083 A1 | 9/2019 | Wurmfeld et al. |
| 2019/0295440 A1 | 9/2019 | Hadad |
| 2019/0298173 A1 | 10/2019 | Lawrence et al. |
| 2019/0298265 A1* | 10/2019 | Keating ............. A61B 5/6823 |
| 2019/0313967 A1 | 10/2019 | Lee |
| 2019/0332140 A1 | 10/2019 | Wang et al. |
| 2019/0332787 A1 | 10/2019 | Graf et al. |
| 2019/0342329 A1 | 11/2019 | Turgeman |
| 2019/0357834 A1 | 11/2019 | Aarts et al. |
| 2020/0001895 A1 | 1/2020 | Scheggi |
| 2020/0005791 A1 | 1/2020 | Rakshit et al. |
| 2020/0062276 A1 | 2/2020 | Yuan et al. |

(56) References Cited

U.S. PATENT DOCUMENTS

| | | |
|---|---|---|
| 2020/0070840 A1 | 3/2020 | Gunaratne |
| 2020/0142497 A1 | 5/2020 | Zhu |
| 2020/0159896 A1 | 5/2020 | Shapiro et al. |
| 2020/0218238 A1 | 7/2020 | Wang |
| 2020/0356652 A1 | 11/2020 | Yamaguchi et al. |
| 2020/0391696 A1 | 12/2020 | Kato et al. |
| 2021/0019731 A1 | 1/2021 | Rule et al. |
| 2021/0029112 A1 | 1/2021 | Palle et al. |
| 2021/0058692 A1* | 2/2021 | Shankar .................. G06F 3/014 |
| 2021/0197849 A1 | 7/2021 | Tsuji |
| 2021/0382684 A1 | 12/2021 | Hachiya et al. |
| 2022/0083149 A1* | 3/2022 | Keller .................... G06F 3/0233 |
| 2022/0233142 A1* | 7/2022 | Hasan ..................... A61B 5/681 |
| 2023/0225671 A1* | 7/2023 | Kosman ............... A61B 5/6826 |
| | | 600/300 |

FOREIGN PATENT DOCUMENTS

| | | |
|---|---|---|
| CN | 104799509 A | 7/2015 |
| CN | 105841851 A | 8/2016 |
| CN | 105960196 | 9/2016 |
| CN | 106360895 A | 2/2017 |
| CN | 206213423 U | 6/2017 |
| CN | 206333477 U | 7/2017 |
| CN | 206371611 U | 8/2017 |
| CN | 107139933 A | 9/2017 |
| CN | 107260139 A | 10/2017 |
| CN | 104157116 A | 12/2017 |
| CN | 105006103 B | 4/2018 |
| CN | 108900691 A | 11/2018 |
| CN | 108926081 A | 12/2018 |
| DE | 10201301233399 | 7/2013 |
| DE | 102015006677 A1 | 11/2016 |
| DE | 102019116618 A1 | 12/2020 |
| EP | 1223191 A1 | 7/2002 |
| EP | 1384752 A1 | 1/2004 |
| EP | 2281205 A1 | 2/2011 |
| EP | 2581856 A1 | 4/2013 |
| JP | 200879676 | 4/2008 |
| KR | 20110012229 A * | 2/2011 |
| KR | 20170013067 | 2/2017 |
| KR | 10-2017-0087113 A | 7/2017 |
| KR | 101835991 B1 | 4/2018 |
| WO | 2001017421 | 3/2001 |
| WO | 2005114476 A1 | 12/2005 |
| WO | 2005124594 A1 | 12/2005 |
| WO | 2008008714 A1 | 1/2008 |
| WO | 2011132009 A2 | 4/2011 |
| WO | 2015/077418 A1 | 5/2015 |
| WO | 2017/136940 A1 | 8/2017 |
| WO | 2018/000396 A1 | 1/2018 |
| WO | 2018048563 A1 | 3/2018 |
| WO | 2018/154341 A1 | 8/2018 |
| WO | 2018164632 | 9/2018 |
| WO | 2018/204811 A1 | 11/2018 |
| WO | 2019/082095 A1 | 5/2019 |
| WO | 2019/140528 A1 | 7/2019 |
| WO | 2019/180626 A1 | 9/2019 |

OTHER PUBLICATIONS

Mario, https://www.smartringnews.com/posts/smart-ring-vs-smartwatch-which-is-the-best-fitness-and-activity-tracker (Year: 2014).

"How to find your ideal bedtime with the Oura app", available online at <https://web.archive.org/web/20191206205332/https://ouraring.com/how-to-find-your-ideal-bedtime-with-the-oura-app/>, 2019, 8 pages.

"Vauxhall/Opel In-Car Wireless Charging", retrieved from <https://www.air-charge.com/aircharge-for-business/automotive/vauxhall-wireless- charging>, Oct. 2019, 4 pages.

"Wireless charging for smart ring/pointing devices" available online at <http://www.humavox.com/smt_product/wireless-charging-for-smart-ringpointing-devices/>, Oct. 2019, 3 pages.

ASU projection wearable: Live tomorrow today (world first launch @ CES 2016). (Dec. 2015). ASU Tech, YouTube. Retrieved from https://www.youtube.com/watch?v=Wdb50-D7YOY.

Brownell, L., "Low-cost wearables manufactured by hybrid 3D printing. Wyss Institute, Harvard," Retrieved from https://wyss.harvard.edu/news/low-cost-wearables-manufactured-by-hybrid-3d-printing/, Sep. 6, 2017, pp. 11.

Cetin, C., "Design, testing and implementation of a new authentication method using multiple devices," Graduate Theses and Dissertations, University of South Florida Scholar Commons. Retrieved from http://scholarcommons.usf.edu/etd/5660, Jan. 2015, pp. 61.

Charles Q. Choi, "Low Battery? New Tech Lets You Wirelessly Share Power", available online at <https://www.livescience.com/54790-new-tech-enables-wireless-charging.html>, May 19, 2016, 9 pages.

Chen, X. A., et al., "Encore: 3D printed augmentation of everyday objects with printed-over, affixed and interlocked attachments," Nov. 5, 2015, pp. 73-82.

Chen, X. A., et al., "Reprise: A design tool for specifying, generating, and customizing 3D printable adaptations on everyday objects," Oct. 16, 2016, pp. 29-39.

E-Senses, "Personal vitamin D, sunlight and daylight coach", available online at <https://e-senses.com/>, 2019, 5 pages.

Hipolite, W., "The 3D printed O Bluetooth Ring is one of the tiniest personal computers you will ever see," 3DPrint.com. Retrieved from https://3dprint.com/34627/o-bluetooth-ring-3d-printed/, Jan. 2015, p. 5.

Hussain Almossawi, "This smart ring aims to provide better lives for people with sickle cell disease", retrieved from <https://www.core77.com/projects/82131/This-Smart-Ring-Aims-to-Provide-Better-Lives-for-People-with-Sickle-Cell-Disease>, 2021, 9 pages.

Je et al., "PokeRing: Notifications by poking around the finger", Proceedings of the 2018 CHI Conference on Human Factors in Computing Systems—CHI'18, 2018, paper 542, pp. 1-10.

Katharine Schwab, "Orii, the ring that turns your finger into a phone, is here", available online at < https://www.fastcompany.com/90399237/orii-the-ring-that-turns-your-finger-into-a-phone-is-here >, 2019, 4 pages.

Magno et al., "Self-sustainable smart ring for long-term monitoring of blood oxygenation", IEEE Access, 2019, pp. 115400-115408.

Mahmud et al., "Wearable technology for drug abuse detection: A survey of recent advancements", Smart Health, vol. 13, Aug. 2019, 100062.

Nassi et al., "Virtual breathalyzer", Department of Software and Information Systems Engineering, Ben-Gurion University of the Negev, Israel, 2016, 10 pages.

Neev Kiran, "SkinnySensor: Enabling Battery-Less Wearable Sensors via Intrabody Power Transfer", Masters Theses 694, University of Massachusetts Amherst, 2018, 63 pages.

Pablo E Suárez, "NXT Ring—Your Digital-self at Hand", available online at <https://www.youtube.com/watch?v=9w7uxDHs7NY>, uploaded on Jun. 21, 2019, 2 pages.

Roumen et al., "NotiRing: A comparative study of notification channels for wearable interactive rings", Proceedings of the 33rd Annual ACM Conference on Human Factors in Computing Systems—CHI'15, 2015, pp. 2497-2500.

Sarah Jacobsson Purewal, "Ringly review: The smart ring that could be sexier", available online at <https://www.macworld.com/article/227133/ringly-review-the-smart-ring-that-could-be-sexier.html>, 2016, 10 pages.

Schwab, K., "This startup wants to kill passwords-and replace them with jewelry. Fast Company, " Retrieved from https://www.fastcompany.com/90254843/this-startup-wants-to-kill-passwords-and-replace-them-with-jewelry, (Oct. 2018), pp. 7.

Seung et al., "Nanopatterned Textile-Based Wearable Triboelectric Nanogenerator", ACS Nano, vol. 9, 2015, pp. 3501-3509.

Shane McGlaun, "Geek builds Bluetooth Smart Ring with OLED display", available online at <https://www.slashgear.com/geek-builds-bluetooth-smart-ring-with-oled-display-02361383/>, 2015, 6 pages.

Sperlazza, "We tested four sleep tracker apps and wearables: Here are the best ones", available online at <https://www.bulletproof.com/sleep/tech/best-sleep-tracker-apps/>, 2019, 18 pages.

(56) References Cited

OTHER PUBLICATIONS

Turunen, "Smart ring for stress control and self-understanding", available online at <https://slowfinland.fi/en/smart-ring-for-stress-control-and-self-understanding/>, 2017, 9 pages.
Worgan et al., "Garment level power distribution for wearables using inductive power transfer", 9th International Conference on Human System Interactions (HSI), 2016, pp. 277-283.
Xiao et al., "LumiWatch: On-arm projected graphics and touch input", Proceedings of the 2018 CHI Conference on Human Factors in Computing Systems—CHI'18, 2018, pp. 1-11.
Zhu et al., "Developing a driving fatigue detection system using physiological sensors", Proceedings of the 29th Australian Conference on Computer-Human Interaction—OZCHI '17, 2017, pp. 566-570.
Zhu, M. et al. "Fluidic fabric muscle sheets for wearable and soft robotics," Retrieved from https://arxiv.org/pdf/1903.08253.pdf, Mar. 2019, pp. 32.
Adafruit, p. 1-2, available at: https://www.adafruit.com/product/2806, published Jun. 2019 (Year: 2019).
Laput et al., "Skin buttons: cheap, small, low-powered and clickable fixed-icon laser projectors", UIST '14: Proceedings of the 27th annual ACM symposium on User interface software and technology, Oct. 2014 pp. 389-394.
Google translation of KR20170087113A (Year: 2016).
"The Oura App | Oura Ring", available online at <https://web.archive.org/web/20191019192921/https://ouraring.com/introducing-the-new-oura-app/>, 6 pages Oct. 29, 2019.
"Get the Technical Specs of Oura Ring | Oura Ring", available online at <https://web.archive.org/web/2019129014439/ https://ouraring.com/tech-specs/>, 3 pages Jan. 29, 2019.
"Learn how the Oura ring works | Go inside | Oura Ring", available online at <https://web.archive.org/web/20181127193557/https://ouraring.com/how-oura-works/>, 5 pages Nov. 27, 2018.
Oura Ring Generation 1 User Manual, available online at < https://fccid.io/2AD7V-OURARING15001/User-Manual/User-Manual-2844448.pdf>, 8 pages Nov. 24, 2015.
Oura Ring Generation 2 User Manual, available online at < https://fccid.io/2AD7V-OURA1801/User-Manual/User-manual-v2-3856414.pdf>, 13 pages Mar. 27, 2018.
Oura ring. Improve sleep. Perform better. by OURA—Kickstarter, available online at <https://web.archive.org/web/20160427015852/https://www.kickstarter.com/projects/oura/oura-ring-improve-sleep-perform-better/description>, 27 pages Apr. 27, 2016.
OURA Ring review—The Gadgeteer, available online at < https://the-gadgeteer.com/2017/08/11/oura-ring-review/> 16 pages Aug. 11, 2017.
Ouraring.com JZ50-0112 user manual available with Gen 2 ring purchase, 2 pages.
Important Information Please Read JZ50-0148 user manual available with gen 2 ring purchase, 4 pages May 13, 2019.
Important Information Please Read JZ50-0149 user manual available with gen 2 ring purchase, 4 pages May 13, 2019.
Oura Ring | Sleep Tracker and Smart Ring with a Heart Rate Monitor, available online at <https://web.archive.org/web/20180709050831/https://ouraring.com/>, 12 pages Jul. 9, 2018.
Introducing the New Oura Ring Generation 3—The Pulse Blog, available online at <https://ouraring.com/blog/oura-generation2-vs-generation3/>, 3 pages Oct. 26, 2021.
Oura Ring 2 Teardown: Inside the NBA's COVID-19-Detecting Smart Ring, available at < https://www.youtube.com/watch?v=BwA1hmSVgVY> (script) Jul. 9, 2020.
Oura Ring 2 Teardown: Inside the NBA's COVID-19-Detecting Smart Ring, available at < https://www.youtube.com/watch?v=BwA1hmSVgVY> (screenshot) Jul. 9, 2020.
Sleep Lab validation of a wellness ring detecting sleep patterns based on photoplethysmogram, actigraphy and body temperature published Feb. 9, 2016, to Kinnunen (Year: 2016), 2016.
Rhee et al., (2000). Artifact-resistant, power-efficient design of finger-ring plethysmographic sensors. Part I: Design and analysis. 4. 2792-2795 vol. 4. 10.1109/IEMBS.2000.901443, 2000.
Rhee et al., (2000). Artifact-resistant, power-efficient design of finger-ring plethysmographic sensors. Part II: Prototyping and benchmarking. 4. 2796-2799 vol. 4. 10.1109/IEMBS.2000.901444, 2000.
Dynamic drinkware-type analysis for mestas.
Liu et al., (2009). UWave: Accelerometer-based personalized gesture recognition and its applications. Pervasive and Mobile Computing. 5. 657-675. 10.1016/j.pmcj.2009.07.007, 2009.
Trigueiros et al., (2019). A comparison of machine learning algorithms applied to hand gesture recognition, 2019.
Castaneda et al., (2018), Int J Biosens Bioelectron. 2018, "A review on wearable photoplethysmography sensors and their potential future applications in health care"; 4(4):195-202. doi:10.15406/ijbsbe.2018.04.00125, 2018.
Mendelson et al., (2006). A Wearable Reflectance Pulse Oximeter for Remote Physiological Monitoring. Conference proceedings : . . . Annual International Conference of the IEEE Engineering in Medicine and Biology Society. IEEE Engineering in Medicine and Biology Society. Conference. 1. 912-5. 10.1109/IEMBS.2006.260137, 2006.
Smiley, S., Active RFID vs. Passive RFID: What's the Difference? https://www.atlasrfidstore.com/rfid-insider/active-rfid-vs-passive-rfid/?srsltid=AfmBOoqhNhYwPPUSENIXB8LarZMm3TVQ4ugn4nTNUhfpy-9yYC_j0wdm, Mar. 2016.
Lawton, G., (2022). Active vs. passive RFID tags: Which to choose: TechTarget. Retrieved from: https://www.techtarget.com/searcherp/tip/Active-vs-passive-RFID-tags-Which-to-choose, Nov. 2022.
Amma et al., (2010). Airwriting recognition using wearable motion sensors. ACM International Conference Proceeding Series. 10. 10.1145/1785455.1785465, 2010.
Zhou et al., (2012). Analysis and Selection of Features for Gesture Recognition Based on a Micro Wearable Device. International Journal of Advanced Computer Science and Applications. 3. 10.14569/IJACSA.2012.030101, 2012.
Rhee et al., (2001). Artifact-resistant power-efficient design of finger-ring plethysmographic sensors. IEEE transactions on biomedical engineering. 48. 795-805. 10.1109/10.930904, 2001.
Ying et al., (2007). Automatic Step Detection in the Accelerometer Signal. 10.1007/978-3-540-70994-7_14, 2007.
100 Best Inventions of 2020 https://time.com/collection/best-inventions-2020/, 2020.
Clark, B. A.. "Color in Sunglass Lenses*." Optometry and Vision Science 46 (1969): 825-840, 1969.
Rhee, Sokwoo. (2006). Design and analysis of artifact-resistive finger photoplethysmographic sensors for vital sign monitoring /, 2006.
Webster, J.G., Design of pulse oximeters Webster—Institute of Physics Publishing—2003, 2003.
Park et al., (2011). E-gesture: A collaborative architecture for energy-efficient gesture recognition with hand-worn sensor and mobile devices. SenSys 2011—Proceedings of the 9th ACM Conference on Embedded Networked Sensor Systems. 359-360. 10.1145/1999995.2000034, 2011.
Teh et al., (2000). Embedding of electronics within thermoplastic polymers using injection moulding technique. Filtration Industry Analyst. 10-18. 10.1109/IEMT.2000.910703, 2000.
Sakai, Tadamoto. (1993). Encapsulation process for electronic devices using injection molding method. Advances in Polymer Technology. 12. 61-71. 10.1002/adv.1993.060120106, 1993.
Ardebili et al.—William Andrew—2019. Encapsulation technologies for electronic applications, 2019.
Au et al., (2009). Episodic Sampling: Towards Energy-efficient Patient Monitoring with Wearable Sensors. Conference proceedings : . . . Annual International Conference of the IEEE Engineering in Medicine and Biology Society. IEEE Engineering in Medicine and Biology Society. Conference. 2009. 6901-5. 10.1109/IEMBS.2009.5333615, 2009.
Silverman, A. (2002). Fifty Years of Glass-Making. Industrial & Engineering Chemistry. 18. 10.1021/ie50201a004, 2002.
Petropoulos et al., (2012). Flexible PCB-MEMS flow sensor. Procedia Engineering. 47. 236-239. 10.1016/j.proeng.2012.09.127, 2012.
Schlömer et al., (2008). Gesture Recognition with a Wii Controller. First publ. in: Proceedings of the 2nd International Conference on

(56) References Cited

OTHER PUBLICATIONS

Tangible and Embedded Interaction 2008, Bonn, Germany, Feb. 18-20, 2008, pp. 11-14. 10.1145/1347390.1347395, 2008.
Rekimoto, J. (2001). GestureWrist and GesturePad: unobtrusive wearable interactiondevices. International Symposium on Wearable Computers, Digest of Papers. 21-27. 10.1109/ISWC.2001.962092, 2001.
Guidelines to Enhancing the Heart-Rate Monitoring Performance of Biosensing Wearables https://www.analog.com/en/resources/technical-articles/guidelines-to-enhancing-the-heartrate-monitoring-performance-of-biosensing-wearables.html, 2019.
Krzyanowski, J. "How are PCB's made? A Beginner's Guide to the PCB Manufacturing Process" Retrieved from Knowledge zone https://vectorbluehub.com/how-are-pcbs-made, 2023.
Ciofu, et al., (2013) Njection and Micro Injection of Polymeric . . . First edition of the International Scientific Conference Modern Technologies in Machine Manufacturing Technology TMCM ISSN 2067-3604, vol. V, No. 1/2013https://modtech.ro/international-journal/vol5no12013/Ciofu_Ciprian_1.pdf, 2013.
Ross, R.J.. (2004). LCP injection molded packages—keys to JEDEC 1 performance. 1807-1811 vol.2. 10.1109/ECTC.2004.1320364, 2004.
Murphy, K. (2012) Machine learning: a probabilistic perspective 2012.
Olofson et al., Machining of titanium alloys—Battelle Memorial Institute, Defense Metals Information Center—1965, 1965.
Asada et al., "Mobile monitoring with wearable photoplethysmographic biosensors," in IEEE Engineering in Medicine and Biology Magazine, vol. 22, No. 3, pp. 28-40, May-Jun. 2003, doi: 10.1109/MEMB.2003.1213624, 2003.
Chen et al., (2009). Monitoring Human Movements at Home Using Wearable Wireless Sensors. Engineering Faculty Presentations, 2009.
On the Heels of 1 Million Rings Sold, Oura Now Valued at $2.55 Billion https://www.businesswire.com/news/home/20220405006108/en/On-the-Heels-of-1-Million-Rings-Sold-Oura-Now-Valued-at-2.55-Billion#:~:text=SAN%20FRANCISCO%2D%2D(BUSINESS%20WIRE,of%20selling%201%2C000%2C000%20Oura%20Rings, Apr. 2022.
Lister et al., (2018) Optical properties of human skin https://www.spiedigitallibrary.org/journals/journal-of-biomedical-optics/volume-17/issue-9/090901/Optical-properties-of-human-skin/10.1117/1.JBO.17.9.090901.full, 2018.
Uchino et al., (2000). Prediction of Optical Properties of Commercial Soda-Lime-Silicate Glasses Containing Iron. Journal of Non-Crystalline Solids. 261. 72-78. 10.1016/S0022-3093(99)00617-1, 2000.
Lawrence et al., (1989) "Pulse Oximetry" Anesthesiology: The journal of the American Society of Anesthesiologists, Inc. vol. 70 No. 1, 1989.
Konig et al., (1998) "Reflectance Pulse Oximetry-Principles and obstetric application in the zurich system" Journal of Clinical Monitoring and Computing vol. 14 No. 6PG. 3-6, 1998.
Hill et al., (2024) The Best Smart Ring to Rule Them All Retrieved from: https://www.wired.com/gallery/best-smart-rings/, 2024.
Kaltenbach, F. (2004). Translucent Materials: Glass, Plastics, Metals, 2004.
Zhu et al., (2011). Wearable Sensor-Based Hand Gesture and Daily Activity Recognition for Robot-Assisted Living. IEEE Transactions on Systems, Man, and Cybernetics, Part A. 41. 569-573. 10.1109/TSMCA.2010.2093883, 2011.
Stables et al., (2022). Why the Oura Ring Gen 3 was our wearable of the year. Retrieved from: https://www.wareable.com/wearable-tech/why-the-oura-ring-3-was-our-wearable-of-the-year-2022, 2022.
Sun et al., (2013). Wireless Power Transfer for Medical Microsystems. 10.1007/978-1-4614-7702-0, 2013.
U.S. Appl. No. 61/768,279, 2013.

* cited by examiner

SMART RING CLIP AND METHOD OF MANUFACTURE

CROSS-REFERENCES TO RELATED APPLICATIONS

This application claims priority to U.S. Provisional Patent Application No. 62/877,391, filed Jul. 23, 2019, and U.S. Provisional Patent Application No. 62/986,905, filed Mar. 9, 2020, both incorporated by reference herein for all purposes.

FIELD OF THE DISCLOSURE

The present disclosure generally relates to implementations of smart ring wearable devices.

BACKGROUND

To the extent that smart ring technology has been adopted, it has a number of challenges. Problems with wearable rings include: they generally need to be removed for charging; they have poor fit; they provide relatively little interactivity; and they provide limited functionality, in general.

BRIEF SUMMARY

This disclosure describes a number of improvements to smart ring technology. Specifically, this disclosure describes multiple techniques for charging smart rings (including harvesting energy, improving wireless charging, improving battery configurations, and increasing functionality while maintaining substantively low energy consumption).

Further, the described techniques include: techniques for measuring and analyzing biometrics; techniques for enabling a variety of security features using smart rings; techniques for improving smart ring form factors; and techniques for using gesture recognition and improving interactivity of smart rings.

According to one aspect of the present disclosure, a smart ring clip comprises a body with a groove for receiving a portion of a ring, and the portion of the ring contacts the body, and the body includes a flexible material. One or more of a battery, a charging unit, a processing unit, a user input unit, a communication unit, a memory unit, at least one sensor unit, and an output unit is one of attached to or disposed within the body. So configured, the body is secured to the ring by the groove and removable from the portion of the ring upon movement of the body in a direction away from the ring.

According to another aspect of the present disclosure, a method of manufacturing a smart ring clip comprises creating a body with a flexible material by one of heat molding, injection molding, ink printing, stamping, metal forming, machining, or additive manufacturing, and creating a groove disposed within the body by one of heat molding, injection molding, ink printing, stamping, metal forming, machining, or additive manufacturing. The groove is for receiving a portion of a ring, and the ring contacts the body. The method further comprises disposing one or more of a battery, a charging unit, a processor unit, a user input unit, a communication unit, a memory unit, at least one sensor unit, an output unit or a user input unit in or on one or more of the body or a housing portion separate from and coupled to the body.

According to yet another aspect of the present disclosure, a system for additively manufacturing a smart ring clip comprises a communication network and a scanning device communicatively coupled to the communication network. The scanning device includes a memory and at least one processor, and the at least one processor of the scanning device executes a scanning module stored on the memory of the scanning device to create a ring-specific scan of a ring to which the smart ring clip is to be attached. The system further comprises a 3D printer communicatively coupled to the communication network and a design system having a computing device communicatively coupled to the communication network, the scanning device, and the 3D printer. The computing device of the design system has a memory, at least one processor, a transmitter, and a receiver, and the computing device receives data from the scanning device relating to the ring-specific scan. The system further includes a module that is stored in the memory of the computing device of the design system and executable by the at least one processor of the computing device of the design system to: (1) receive data from the scanning device relating to the ring-specific scan; and (2) create a ring-specific smart ring clip profile based at least in part on the data received from the scanning device. The ring-specific smart ring clip profile is configured to be transmitted to the 3D printer to implement the ring-specific smart ring clip profile. So configured, the scanning device creates the ring-specific scan and the 3D printer receives the ring-specific smart ring profile from the computing device of the design center and implements the ring-specific smart ring profile to additively manufacture a smart ring clip. The smart ring clip comprises a body with a groove for receiving a portion of the ring, the ring contacts the body, the body includes flexible material. Further, one or more of a battery, a charging unit, a processing unit, a user input unit, a communication unit, a memory unit, at least one sensor unit, and an output unit one of attached to or disposed within the body.

In further accordance with any one or more of the exemplary aspects, the smart ring clip, the method of manufacturing a smart ring clip, the system for additively manufacturing a smart ring clip or any other method or system of the present disclosure may include any one or more of the following preferred forms and/or methods.

According to one form, the body may include a first end and a second end disposed opposite the first end, and the groove may extend along the length of the body between the first end and the second end.

According to another form, the body may further comprise an inside surface configured to contact the ring, and the inside surface may have one or more of an output element and a sensor.

According to yet another form, the body may further comprise an outside surface, and the outside surface may have one or more of an output element and a sensor.

In another form, the body may include one of a semi-circular shape, a partially circular shape, or a partially semi-circular shape.

In another form, the smart ring clip may further comprise a housing portion removably coupled to an outside surface of the body. The housing portion may include one or more of the battery, the charging unit, the processing unit, the user input unit, the communication unit, the memory unit, the sensor unit, and the output unit.

In yet another form, one or more of a portion of the body or the entire body may comprise an electric sensor fabric material.

In another form, a portion of the body may include a silicone material configured to function as part of one of an artificial muscle or a nerve, and the silicone material may be capable of one or more of generating electricity or sensing pressure.

In yet another form, the body may be one or more of additively manufactured or heat molded to a ring of a user obtained by one or more of scanning or photographing a portion of the ring or a mold indicative of the ring of the user to which the smart ring clip will be attached.

According to one method, the method may comprise coupling a housing portion to the additively manufactured body of the smart ring clip, and the housing portion may include one or more of a battery, a charging unit, a processing unit, a user input unit, a communication unit, a memory unit, at least one sensor unit, an output unit or a user input unit.

In another method, the method may further comprise disposing one or more of a sensor or an output element on an inside surface of the body.

In still another method, the method may further comprise disposing one or more of a sensor or an output element on an outside surface of the body.

In yet another method, creating a body with a flexible material by one of heat molding, injection molding, ink printing, stamping, metal forming, machining, or additive manufacturing may comprise creating a body with a flexible material and having one or more of a partially semi-circular shape or a semi-circular shape.

In another method, creating a body with flexible material by one of heating molding, injection molding, ink printing, stamping, metal forming, machining, or additive manufacturing may comprise creating a body having a first end and a second end and an inside surface disposed between the first end and the second end.

In another method, creating a groove disposed within the body by one of heat molding, injection molding, ink printing, stamping, metal forming, machining, or additive manufacturing may comprise creating a groove extending between the first end and the second end along the length of the body.

In another form, the scanning device may further comprise a transmitter and a receiver, and the transmitter may transmit the scanning data to the computing device of the design center.

In still another form, the 3D printer may have a memory, at least one processor, a transmitter and a receiver, and the receiver of the 3D printer may receive the ring-specific smart ring clip profile from the computing device of the design center and the at least one processor of the 3D printer executing the ring-specific smart ring clip profile to additively manufacture the body of the smart ring clip.

In another form, the scanning device may be a volumetric capture sensor.

Depending upon the embodiment, one or more benefits may be achieved. These benefits and various additional objects, features and advantages of the present disclosure can be fully appreciated with reference to the detailed description and accompanying drawings that follow.

DETAILED DESCRIPTION

Figure 1:
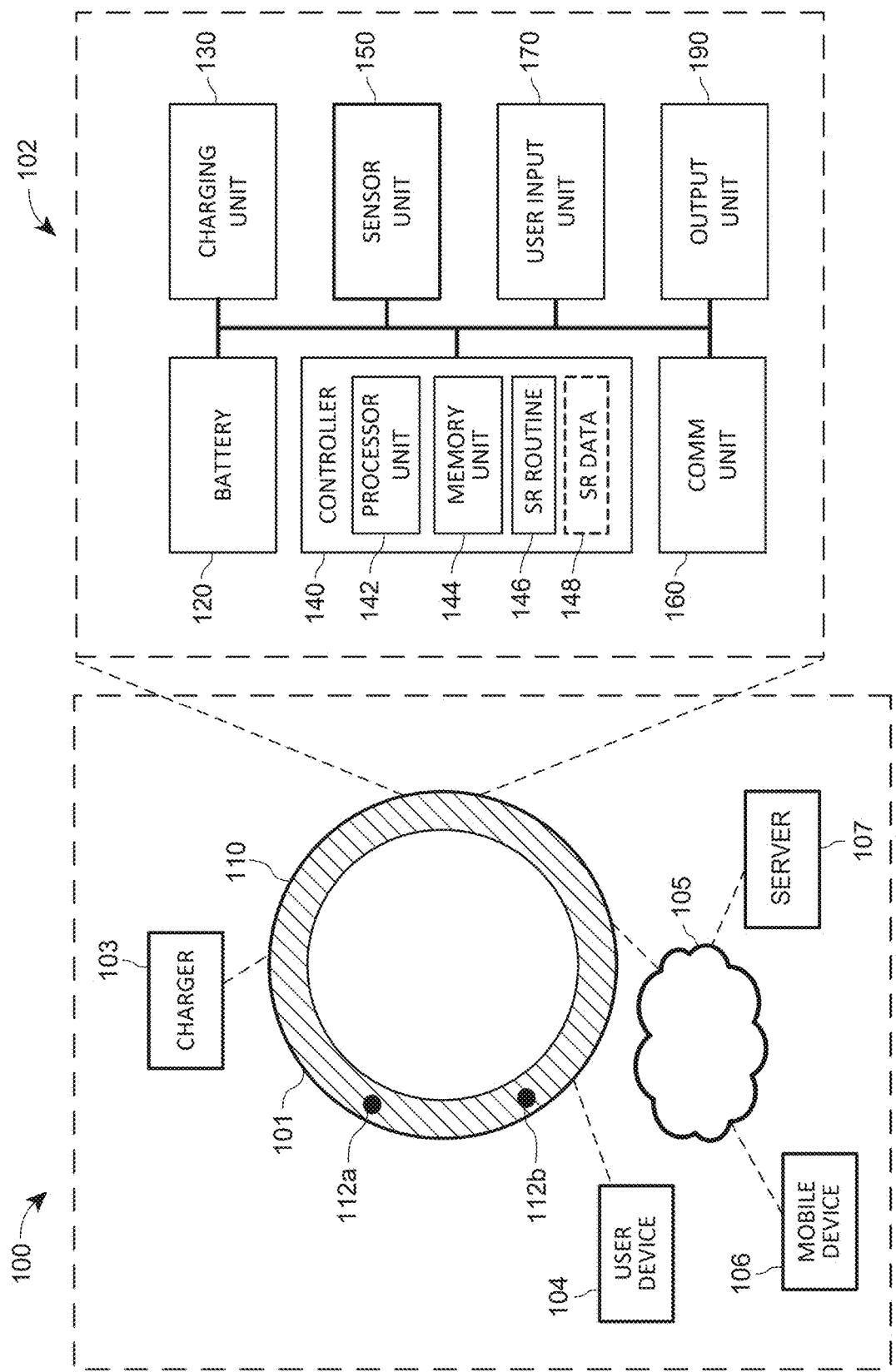
FIG. 1 illustrates a system comprising a smart ring and a block diagram of smart ring components according to some embodiments.

FIG. 1 illustrates a system 100 comprising (i) a smart ring 101 including a set of components 102 and (ii) one or more devices or systems that may be electrically, mechanically, or communicatively connected to the smart ring 101. Specifically, the system 100 may comprise any one or more of: a charger 103 for the smart ring 101, a user device 104, a network 105, a mobile device 106, or a server 107. The charger 103 may provide energy to the smart ring 101 by way of a direct electrical, a wireless, or an optical connection. The smart ring 101 may be in a direct communicative connection with the user device 104, the mobile device 106, or the server 107 by way of the network 105. Interactions between the smart ring 101 and other components of the system 100 are discussed in more detail in the context of FIG. 4.

The smart ring 101 may sense a variety of signals indicative of activities of a user wearing the ring 101, biometric signals, a physiological state of the user, or signals indicative of the user's environment. The smart ring 101 may analyze the sensed signals using built-in computing capabilities or in cooperation with other computing devices (e.g., user device 104, mobile device 106, server 107) and provide feedback to the user or about the user via the smart ring 101 or other devices (e.g., user device 104, mobile device 106, server 107). Additionally or alternatively, the smart ring 101 may provide the user with notifications sent by other devices, enable secure access to locations or information, or a variety of other applications pertaining to health, wellness, productivity, or entertainment.

The smart ring 101, which may be referred to herein as the ring 101, may comprise a variety of mechanical, electrical, optical, or any other suitable subsystems, devices, components, or parts disposed within, at, throughout, or in mechanical connection to a housing 110 (which may be ring shaped and generally configured to be worn on a finger). Additionally, a set of interface components 112a and 112b may be disposed at the housing, and, in particular, through the surface of the housing. The interface components 112a and 112b may provide a physical access (e.g., electrical, fluidic, mechanical, or optical) to the components disposed within the housing. The interface components 112a and 112b may exemplify surface elements disposed at the housing. As discussed below, some of the surface elements of the housing may also be parts of the smart ring components.

As shown in FIG. 1, the components 102 of the smart ring 101 may be distributed within, throughout, or on the housing 110. As discussed in the contexts of FIG. 2 and FIG. 3 below, the housing 110 may be configured in a variety of ways and include multiple parts. The smart ring components 102 may, for example, be distributed among the different parts of the housing 110, as described below, and may include surface elements of the housing 110. The housing 110 may include mechanical, electrical, optical, or any other suitable subsystems, devices, components, or parts disposed within or in mechanical connection to the housing 110, including a battery 120, a charging unit 130, a controller 140, a sensor system 150 comprising one or more sensors, a communications unit 160, a one or more user input devices 170, or a one or more output devices 190. Each of the components 120, 130, 140, 150, 160, 170, and/or 190 may include one or more associated circuits, as well as packaging elements. The components 120, 130, 140, 150, 160, 170, and/or 190 may be electrically or communicatively connected with each other (e.g., via one or more busses or links, power lines, etc.), and may cooperate to enable "smart" functionality described within this disclosure.

The battery 120 may supply energy or power to the controller 140, the sensors 150, the communications unit 160, the user input devices 170, or the output devices 190. In some scenarios or implementations, the battery 120 may supply energy or power to the charging unit 130. The charging unit 130, may supply energy or power to the battery 120. In some implementations, the charging unit 130 may supply (e.g., from the charger 103, or harvested from other sources) energy or power to the controller 140, the sensors 150, the communications unit 160, the user input devices 170, or the output devices 190. In a charging mode of operation of the smart ring 101, the average power supplied by the charging unit 130 to the battery 120 may exceed the average power supplied by the battery 120 to the charging unit 130, resulting in a net transfer of energy from the charging unit 130 to the battery 120. In a non-charging mode of operation, the charging unit 130 may, on average, draw energy from the battery 120.

The battery 120 may include one or more cells that convert chemical, thermal, nuclear or another suitable form of energy into electrical energy to power other components or subsystems 140, 150, 160, 170, and/or 190 of the smart ring 101. The battery 120 may include one or more alkaline, lithium, lithium-ion and or other suitable cells. The battery 120 may include two terminals that, in operation, maintain a substantially fixed voltage of 1.5, 3, 4.5, 6, 9, 12 V or any other suitable terminal voltage between them. When fully charged, the battery 120 may be capable of delivering to power-sinking components an amount of charge, referred to herein as "full charge," without recharging. The full charge of the battery may be 1, 2, 5, 10, 20, 50, 100, 200, 500, 1000, 2000, 5000 mAh or any other suitable charge that can be delivered to one or more power-consuming loads as electrical current.

The battery 120 may include a charge-storage device, such as, for example a capacitor or a super-capacitor. In some implementations discussed below, the battery 120 may be entirely composed of one or more capacitive or charge-storage elements. The charge storage device may be capable of delivering higher currents than the energy-conversion cells included in the battery 120. Furthermore, the charge storage device may maintain voltage available to the components or subsystems 130, 150, 160, 170, and/or 190 when one or more cells of the battery 120 are removed to be subsequently replaced by other cells.

The charging unit 130 may be configured to replenish the charge supplied by the battery 120 to power-sinking components or subsystems (e.g., one or more of subsystems 130, 150, 160, 170, and/or 190) or, more specifically, by their associated circuits. To replenish the battery charge, the charging unit 130 may convert one form of electrical energy into another form of electrical energy. More specifically, the charging unit 130 may convert alternating current (AC) to direct current (DC), may perform frequency conversions of current or voltage waveforms, or may convert energy stored in static electric fields or static magnetic fields into direct current. Additionally or alternatively, the charging unit 130 may harvest energy from radiating or evanescent electromagnetic fields (including optical radiation) and convert it into the charge stored in the battery 120. Furthermore, the charging unit 130 may convert non-electrical energy into electrical energy. For example, the charging unit 130 may harvest energy from motion, or from thermal gradients.

The controller 140 may include a processor unit 142 and a memory unit 144. The processor unit 142 may include one or more processors, such as a microprocessor (µP), a digital signal processor (DSP), a central processing unit (CPU), a graphical processing unit (GPU), a field-programmable gate array (FPGA), an application-specific integrated circuit (ASIC), or any other suitable electronic processing components. Additionally or alternatively, the processor unit 142 may include photonic processing components.

The memory unit 144 may include one or more computer memory devices or components, such as one or more registers, RAM, ROM, EEPROM, or on-board flash memory. The memory unit 144 may use magnetic, optical, electronic, spintronic, or any other suitable storage technology. In some implementations, at least some of the functionality the memory unit 144 may be integrated in an ASIC or and FPGA. Furthermore, the memory unit 144 may be integrated into the same chip as the processor unit 142 and the chip, in some implementations, may be an ASIC or an FPGA.

The memory unit 144 may store a smart ring (SR) routine 146 with a set of instructions, that, when executed by the processor 142 may enable the operation and the functionality described in more detail below. Furthermore, the memory unit 144 may store smart ring (SR) data 148, which may include (i) input data used by one or more of the components 102 (e.g., by the controller when implementing the SR routine 146) or (ii) output data generated by one or more of the components 102 (e.g., the controller 140, the sensor unit 150, the communication unit 160, or the user input unit 170). In some implementations, other units, components, or devices may generate data (e.g., diagnostic data) for storing in the memory unit 144.

The processing unit 142 may draw power from the battery 120 (or directly from the charging unit 130) to read from the memory unit 144 and to execute instructions contained in the smart ring routine 146. Likewise, the memory unit 144 may draw power from the battery 120 (or directly from the charging unit 130) to maintain the stored data or to enable reading or writing data into the memory unit 144. The processor unit 142, the memory unit 144, or the controller 140 as a whole may be capable of operating in one or more low-power mode. One such low power mode may maintain the machine state of the controller 140 when less than a threshold power is available from the battery 120 or during a charging operation in which one or more battery cells are exchanged.

The controller 140 may receive and process data from the sensors 150, the communications unit 160, or the user input devices 170. The controller 140 may perform computations to generate new data, signals, or information. The controller 140 may send data from the memory unit 144 or the generated data to the communication unit 160 or the output devices 190. The electrical signals or waveforms generated by the controller 140 may include digital or analog signals or waveforms. The controller 140 may include electrical or electronic circuits for detecting, transforming (e.g., linearly or non-linearly filtering, amplifying, attenuating), or converting (e.g., digital to analog, analog to digital, rectifying, changing frequency) of analog or digital electrical signals or waveforms.

The sensor unit 150 may include one or more sensors disposed within or throughout the housing 110 of the ring 101. Each of the one or more sensors may transduce one or more of: light, sound, acceleration, translational or rotational movement, strain, temperature, chemical composition, surface conductivity or other suitable signals into electrical or electronic sensors or signals. A sensor may be acoustic, photonic, micro-electro-mechanical systems (MEMS) sensors, chemical, micro-fluidic (e.g., flow sensor), or any other suitable type of sensor. The sensor unit 150 may include, for example, an inertial motion unit (IMU) for detecting orientation and movement of the ring 101.

The communication unit 160 may facilitate wired or wireless communication between the ring 101 and one or more other devices. The communication unit 160 may include, for example, a network adaptor to connect to a computer network, and, via the network, to network-connected devices. The computer network may be the Internet or another type of suitable network (e.g., a personal area network (PAN), a local area network (LAN), a metropolitan area network (MAN), a wide area network (WAN), a mobile, a wired or wireless network, a private network, a virtual private network, etc.). The communication unit 160 may use one or more wireless protocols, standards, or technologies for communication, such as Wi-Fi, near field communication (NFC), Bluetooth, or Bluetooth low energy (BLE). Additionally or alternatively, the communication unit 160 may enable free-space optical or acoustic links. In some implementations, the communication unit 160 may include one or more ports for a wired communication connections. The wired connections used by the wireless communication module 160 may include electrical or optical connections (e.g., fiber-optic, twisted-pair, coaxial cable).

User input unit 170 may collect information from a person wearing the ring 101 or another user, capable of interacting with the ring 101. In some implementations, one or more of the sensors in the sensor unit 150 may act as user input devices within the user input unit 170. User input devices may transduce tactile, acoustic, video, gesture, or any other suitable user input into digital or analog electrical signal, and send these electrical signals to the controller 140.

The output unit 190 may include one or more devices to output information to a user of the ring 101. The one or more output devices may include acoustic devices (e.g., speaker, ultrasonic); haptic (thermal, electrical) devices; electronic displays for optical output, such as an organic light emitting device (OLED) display, a laser unit, a high-power light-emitting device (LED), etc.; or any other suitable types of devices. For example, the output unit 190 may include a projector that projects an image onto a suitable surface. In some implementations, the sensor unit 150, the user input unit 170, and the output unit 190 may cooperate to create a user interface with capabilities (e.g., a keyboard) of much larger computer systems, as described in more detail below.

The components 120, 130, 140, 150, 160, 170, and/or 190 may be interconnected by a bus 195, which may be implemented using one or more circuit board traces, wires, or other electrical, optoelectronic, or optical connections. The bus 195 may be a collection of electrical power or communicative interconnections. The communicative interconnections may be configured to carry signals that conform to any one or more of a variety of protocols, such as 12C, SPI, or other logic to enable cooperation of the various components.

Figure 2:
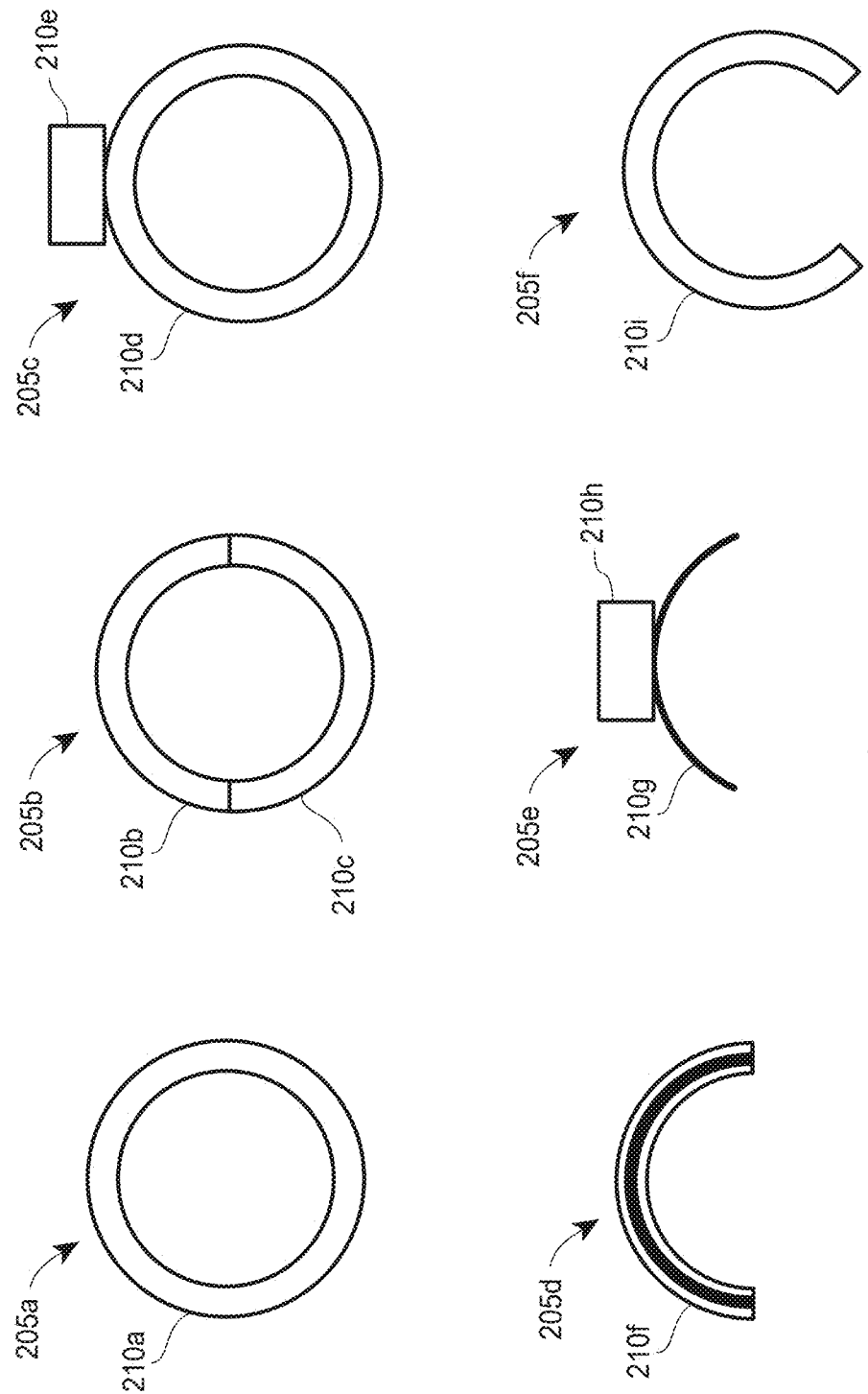
FIG. 2 illustrates a number of different form factor types of a smart ring according to some embodiments.

FIG. 2 includes a number of different example form factor types or configurations 205a, 205b, 205c, 205d, 205e, and/or 205f of a smart ring or smart ring clip (e.g., the smart ring 101). The configurations 205a, 205b, 205c, 205d, 205e, and/or 205f (which may also be referred to as the smart rings or smart ring clips 205a, 205b, 205c, 205d, 205e, and/or 205f) may each represent an implementation of the smart ring 101, and each may include any one or more of the components 102 (or components similar to the components 102). In some embodiments, one or more of the components 102 may not be included in the configurations 205a, 205b, 205c, 205d, 205e, and/or 205f. The configurations 205a, 205b, 205c, 205d, 205e, and/or 205f include housings 210a, 210b, 210c, 210d, 210e, and/or body 210f, which may be similar to the housing 110 shown in FIG. 1.

The configuration 205a may be referred to as a band-only configuration comprising a housing 210a. In the configuration 205b, a band may include two or more removably connected parts, such as the housing parts 210b and 210c. The two housing parts 210b and 210c may each house at least some of the components 102, distributed between the housing parks 210b and 210c in any suitable manner.

The configuration 205c may be referred to as a band-and-platform configuration comprising (i) a housing component 210d and (ii) a housing component 210e (sometimes called the "platform 210e"), which may be in a fixed or removable mechanical connection with the housing 210d. The platform 210e may function as a mount for a "jewel" or for any other suitable attachment. The housing component 210d and the platform 210e may each house at least one or more of the components 102 (or similar components).

In some instances, the term "smart ring" may refer to a partial ring that houses one or more components (e.g., components 102) that enable the smart ring functionality described herein. The configurations 205d and 205e may be characterized as "partial" smart rings, and may be configured for attachment to a second ring. The second ring may be a conventional ring without smart functionality, or may be second smart ring, wherein some smart functionality of the first or second rings may be enhanced by the attachment.

The configuration 205d, for example, may include a body 210f with a groove to enable clipping onto a conventional ring. The grooved clip-on body 210f may house the smart ring components described above. The configuration 205e may clip onto a conventional ring using a substantially flat clip 210g part of the body and contain the smart ring components in a platform part of the housing portion 210h.

The configuration 205f, on the other hand, may be configured to be capable of being mounted onto a finger of a user without additional support (e.g., another ring). To that end, the housing 210i of the configuration 205f may be substantially of a partial annular shape subtending between 180 and 360 degrees of a full circumference. When implemented as a partial annular shape, the housing 210i may be more adaptable to fingers of different sizes that a fully annular band (360 degrees), and may be elastic. A restorative force produced by a deformation of the housing 210i may ensure a suitable physical contact with the finger. Additional suitable combinations of configurations (not illustrated) may combine at least some of the housing features discussed above.

Figure 3:
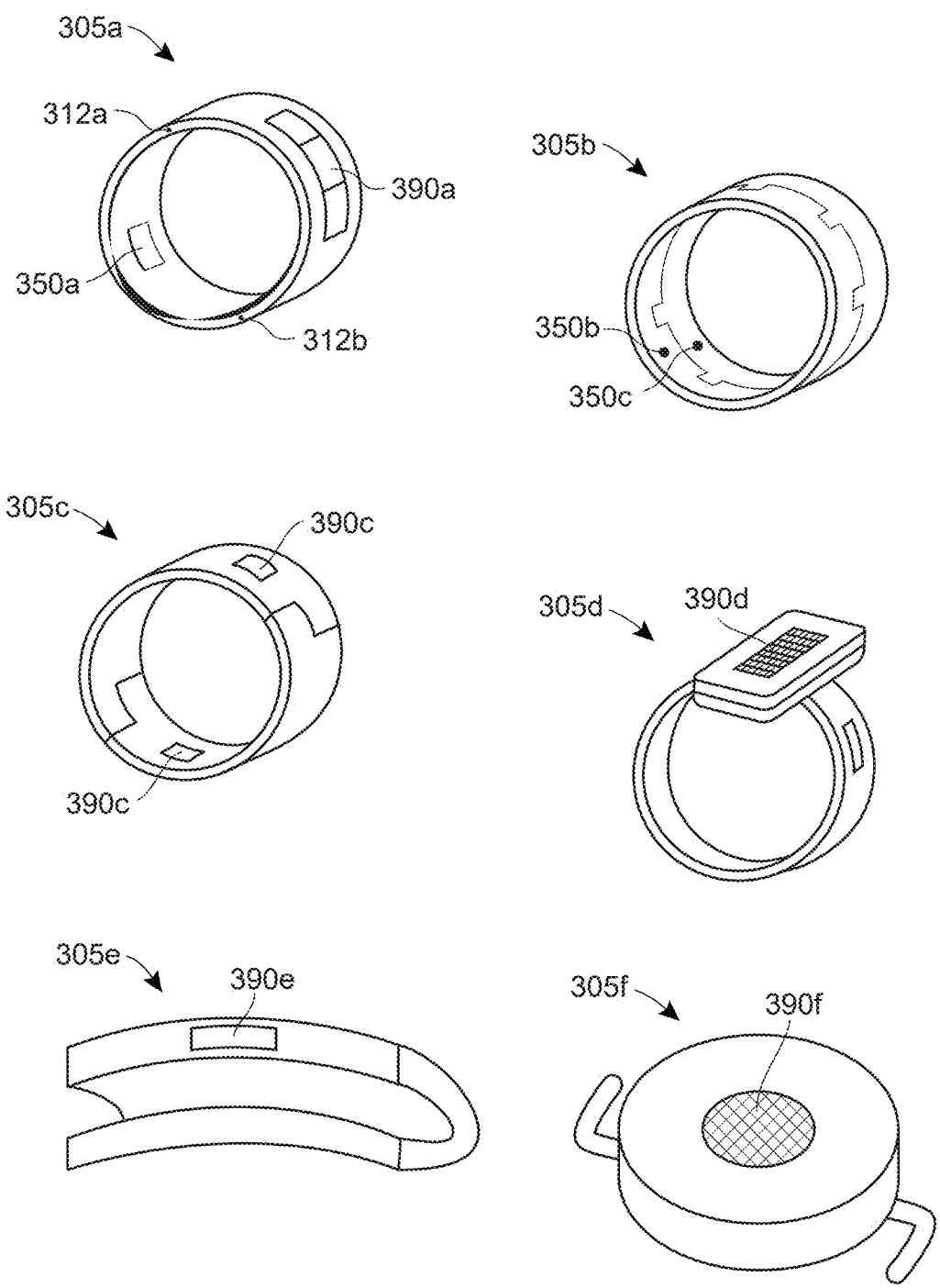
FIG. 3 illustrates examples of different smart ring form factors.

FIG. 3 includes perspective views of example configurations 305a, 305b, 305c, 305d, 305e, and/or 305f of a smart ring (e.g., the smart ring 101) in which a number of surface elements are included.

Configuration 305a is an example band configuration 205a of a smart ring (e.g., smart ring 101). Some of the surface elements of the housing may include interfaces 312a, 312b that may be electrically connected to, for example, the charging unit 130 or the communications unit 160. On the outside of the configuration 305a, the interfaces 312a, 312b may be electrically or optically connected with a charger to transfer energy from the charger to a battery (e.g., the battery 120), or with another device to transfer data to or from the ring 305a. The outer surface of the configuration 305a may include a display 390a, while the inner surface may include a biometric sensor 350a.

The configurations 305b and 305c are examples of configurations of a smart ring with multiple housing parts (e.g., configuration 205b in FIG. 2). Two (or more) parts may be separate axially (configuration 305b), azimuthally (configuration 305c), or radially (nested rings, not shown). The parts may be connected mechanically, electrically, or optically via, for example, interfaces analogous to interfaces 312a, 312b in configuration 305a. Each part of a smart ring housing may have one or more surface elements, such as, for example, sensors 350b, 350c or output elements 390b, 390c. The latter may be LEDs (e.g., output element 390b) or haptic feedback devices (e.g., output element 390c), among other suitable sensor or output devices. Additionally or alternatively, at least some of the surface elements (e.g., microphones, touch sensors) may belong to the user input unit 170.

Configuration 305d may be an example of a band and platform configuration (e.g., configuration 205c), while configurations 305e and 305f may be examples of the partial ring configurations 205d and 205e, respectively. Output devices 390d, 390e, and/or 390f on the corresponding configurations 305d, 305e, and/or 305f may be LCD display, OLED displays, e-ink displays, one or more LED pixels, speakers, or any other suitable output devices that may be a part of a suite of outputs represented by an output unit (e.g., output unit 190). Other surface elements, such as an interface component 312c may be disposed within, at, or through the housing. It should be appreciated that a variety of suitable surface elements may be disposed at the illustrated configurations 305a, 305b, 305c, 305d, 305e, and/or 305f at largely interchangeable locations. For example, the output elements 390d, 390e, and/or 390f may be replaced with sensors (e.g., UV sensor, ambient light or noise sensors, etc.), user input devices (e.g., buttons, microphones, etc.), interfaces (e.g., including patch antennas or optoelectronic components communicatively connected to communications units), or other suitable surface elements.

Figure 4:
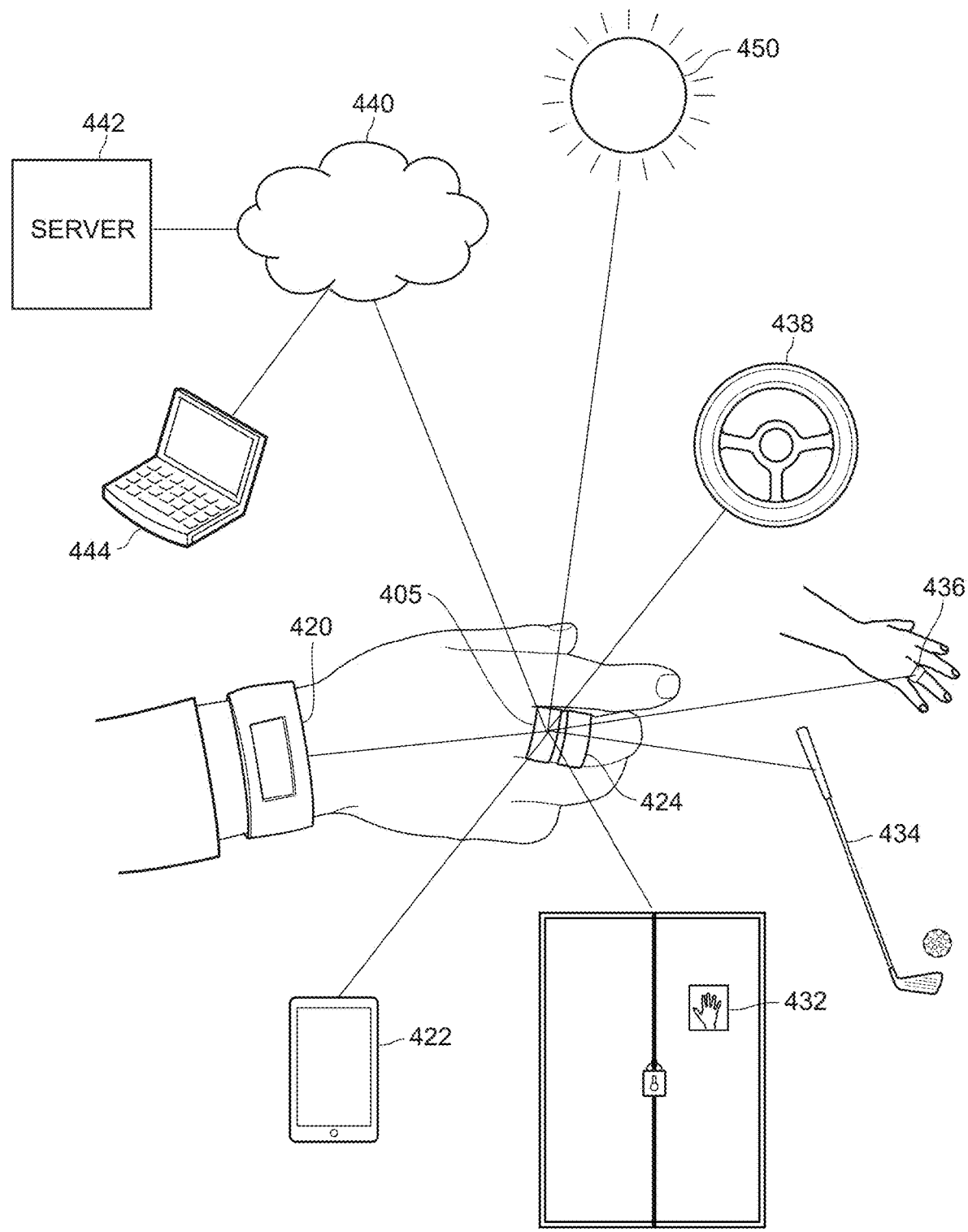
FIG. 4 illustrates an environment within which a smart ring may operate according to some embodiments.

FIG. 4 illustrates an example environment within which a smart ring 405 may be configured to operate. In an embodiment, the smart ring 405 may be the smart ring 101. In some embodiments, the smart ring 405 may be any suitable smart ring capable of providing at least some of the functionality described herein. Depending on the embodiment, the smart ring 405 may be configured in a manner similar or equivalent to any of the configurations 205a. 205b, 205c, 205d, 205e, and/or 205f or 305a, 305b, 305c, 305d, 305e, and/or 305f shown in FIG. 2 and FIG. 3.

The smart ring 405 may interact (e.g., by sensing, sending data, receiving data, receiving energy) with a variety of devices, such as bracelet 420 or another suitable wearable device, a mobile device 422 (e.g., a smart phone, a tablet, etc.) that may be, for example, the user device 104, another ring 424 (e.g., another smart ring, a charger for the smart ring 405, etc.), a secure access panel 432, a golf club 434 (or another recreational accessory), a smart ring 436 worn by another user, or a steering wheel 438 (or another vehicle interface). Additionally or alternatively, the smart ring 405 may be communicatively connected to a network 440 (e.g., WiFi, 5G cellular), and by way of the network 440 (e.g., network 105 in FIG. 1) to a server 442 (e.g., server 107 in FIG. 1) or a personal computer 444 (e.g., mobile device 106). Additionally or alternatively, the ring 405 may be configured to sense or harvest energy from natural environment, such as the sun 450.

The ring 405 may exchange data with other devices by communicatively connecting to the other devices using, for example, the communication unit 160. The communicative connection to other device may be initiated by the ring 405 in response to user input via the user input unit 170, in response to detecting trigger conditions using the sensor unit 150, or may be initiated by the other devices. The communicative connection may be wireless, wired electrical connection, or optical. In some implementation, establishing a communicative link may include establishing a mechanical connection.

The ring 405 may connect to other devices (e.g., a device with the charger 103 built in) to charge the battery 120. The connection to other devices for charging may enable the ring 405 to be recharged without the need for removing the ring 405 from the finger. For example, the bracelet 420 may include an energy source that may transfer the energy from the energy source to battery 120 of the ring 405 via the charging unit 430. To that end, an electrical (or optical) cable may extend from the bracelet 420 to an interface (e.g., interfaces 112a, 112b, 312a, 312b) disposed at the housing (e.g., housings 110, 210a, 210b, 210c, 210d, 210e, 210f, 210g, 210h, and/or 210i) of the ring 405. The mobile device 422, the ring 424, the golf club 434, the steering wheel 438 may also include energy source configured as chargers (e.g., the charger 103) for the ring 405. The chargers for may transfer energy to the ring 405 via a wired or wireless (e.g., inductive coupling) connection with the charging unit 130 of the ring 405.

Figure 5:
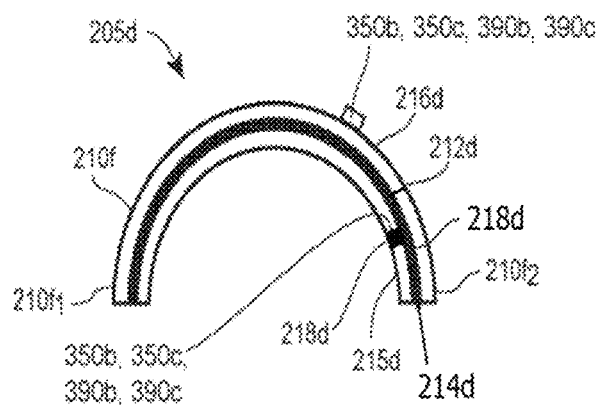
FIG. 5 is a view of a smart ring clip of FIG. 2 according to some embodiments.
Figure 7:
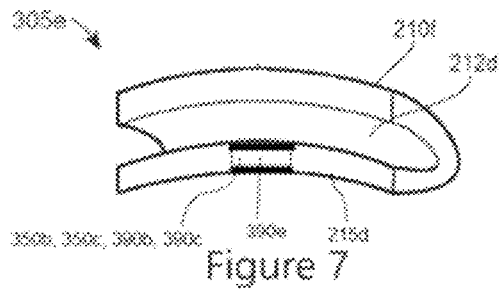
FIG. 7 is a view of a portion of a smart ring clip of FIG. 3 according to some embodiments.

Referring now to FIG. 5, the smart ring 205d of FIG. 2 is depicted with some additional features. More specifically, the smart ring configuration 205d is a smart ring clip 205d including a body 210f. The body 210f includes a groove 212d, as depicted in FIG. 7, for receiving a portion of a ring 214d, as depicted in FIG. 5. In addition, when a portion of the ring 214d is disposed within the groove 212d, as depicted in FIGS. 5 and 7, the portion of the ring contacts the body 210f to secure the ring 214d to the smart ring clip 205d. The portion of the ring 214d may be a smart ring, such as any of the foregoing described smart rings. Alternatively, the portion of the ring 214d may be a conventional ring without any smart features, for example.

In addition, the smart ring clip 205d may further include one or more of the battery 120, the charging unit 130, the controller 140, the processor unit 142, the memory unit 144, the sensor unit 150 comprising one or more sensors, the communications unit 160, one or more user input devices 170, or one or more output devices 190, each of which may be attached to or disposed within the body 210f. So configured, the body 210f may be secured to the portion of the ring 214d by the groove 212d, which clips onto the portion of the ring 214d when the smart ring clip 205d is disposed on the portion of the ring 214d. In addition, the body 210f of the smart ring clip 205d is removable from the portion of the ring 214d upon movement of the body 210f of the smart ring clip 205d in a direction away from the ring 214d.

As further depicted in FIG. 5, the body 210f of the smart ring clip 205d may further include a first end 210f1 and a second end 210f2 disposed opposite the first end 210f1. The groove 212d (shown in FIG. 7) may extend along the length, such as a circumferential length, of the body 210f of the smart ring clip 205f between the first end and the second end 210f1, 210f2. In addition, the body 210f includes an inside surface 215d (as shown in FIG. 7) and 218d (as shown in FIG. 5) configured to contact the portion of the ring 214d and an outside surface 216d. The inside surface 215d, 218d may include the sensor 350b, 350c or the output element 390b, 390c. Each of the sensors 350b. 350c and the output elements 390b, 390c are previously defined above. Further, the body 210f may also include an outside surface 216d and the outside surface 216d may include one or more of the sensors 350b, 350c or the output elements 390b. 390c, each of which may be a surface element disposed on and in the same plane as the outside surface 216. Alternatively, the sensors 350b, 350c or output elements 390b, 390c may outwardly extend from the outside surface 216d of the smart ring clip 205d and still fall within the scope of the present disclosure.

As also depicted in FIG. 5, the body 210f of the smart ring clip 205d may include a partially annular shape, such as a partially circular shape or a semi-circular shape. While the body 210f is depicted as semi-circular in shape, the body 210f may alternatively be only partially semi-circular in shape, such as a portion of the semi-circular shaped body 210f depicted in FIG. 5, and still fall within the scope of the present disclosure.

Figure 6:
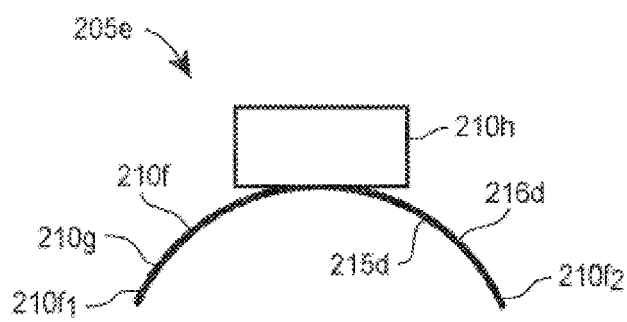
FIG. 6 is a view of another smart ring clip of FIG. 2 according to some embodiments.

Referring now to FIG. 6, the smart ring configuration 205e of FIG. 2 is depicted with additional features. Specifically, the smart ring configuration 205e is another smart ring clip 205e with some features similar to the smart ring clip 205d of FIG. 5. For example, like the smart ring clip 205d, the smart ring clip 205e includes the body 210f having the first end 210f1 and the second end 210f2 disposed opposite the first end 210f1. In addition, the smart ring clip 205e also includes the inside surface 215d and the outside surface 216d. However, unlike the smart ring clip 205d of FIG. 5, the smart ring clip 205e includes a platform portion, such as a separate housing portion 210h, that is removably coupled to the outside surface 216d of the smart ring clip 205e. The housing portion 210h includes one or more of the one or more of the battery 120, the charging unit 130, the controller 140, the processor unit 142, the memory unit 144, the sensor unit 150 comprising one or more sensors, the communications unit 160, one or more user input devices 170, or one or more output devices 190. In addition, the like the smart ring clip 205d of FIG. 5, the body 210f of the smart ring clip may also include one or more of the battery 120, the charging unit 130, the controller 140, the processor unit 142, the memory unit 144, the sensor unit 150 comprising one or more sensors, the communications unit 160, one or more user input devices 170, or one or more output devices 190, each of which may be attached to or disposed within the body 210f. Further, the body 210f of the smart ring clip 205e may also include the substantially flat clip portion 210g configured to be attached to a conventional ring or a smart ring, such as one or more of the aforementioned and previously described smart rings.

Each of the foregoing smart ring clips 205d, 205e may include an electric sensor fabric material. For example, a portion of or the entire body 210f may include the electric sensor fabric. Additionally or alternatively, the body 210f may include silicone material configured to function as part of one of an artificial muscle or a nerve. The silicone material is capable of one or more of generating electricity or sensing pressure. Moreover, each smart ring clip 205d, 205e may be one of additively manufactured or heat molded according to dimensions of a ring to which the smart ring clip is to be coupled. Such dimensions may be obtained by one of scanning or photographing a portion of the ring or a mold indicative of the ring's dimensions, for example, as explained more below.

Referring now to FIG. 7, a cross-section view of a portion 305e of the smart ring clip 205d of FIG. 5 is depicted. The portion 305e includes the body 210f of the smart ring clip 205d, and a portion of the groove 212d. In this example, the groove 212d is rounded in shape, which corresponds to a typically rounded shape of the portion of the ring 214d, which is not depicted in this view, and to which the smart ring clip 205d is attached. The portion 305e of the smart ring clip 205d also includes the inside surface 215d and a surface element 390e. Here, the surface element 390e may include one or more of the sensors 350b, 350c or the output elements 390b, 390, each of which are previously defined above. Additionally and/or optionally, the surface element 390e may include an output device, such as an LCD display, OLED displays, e-ink displays, one or more LED pixels, speakers, and any other suitable output device that may be a part of a suite of outputs represented by the output unit, e.g., the output unit 190.

Figure 8:
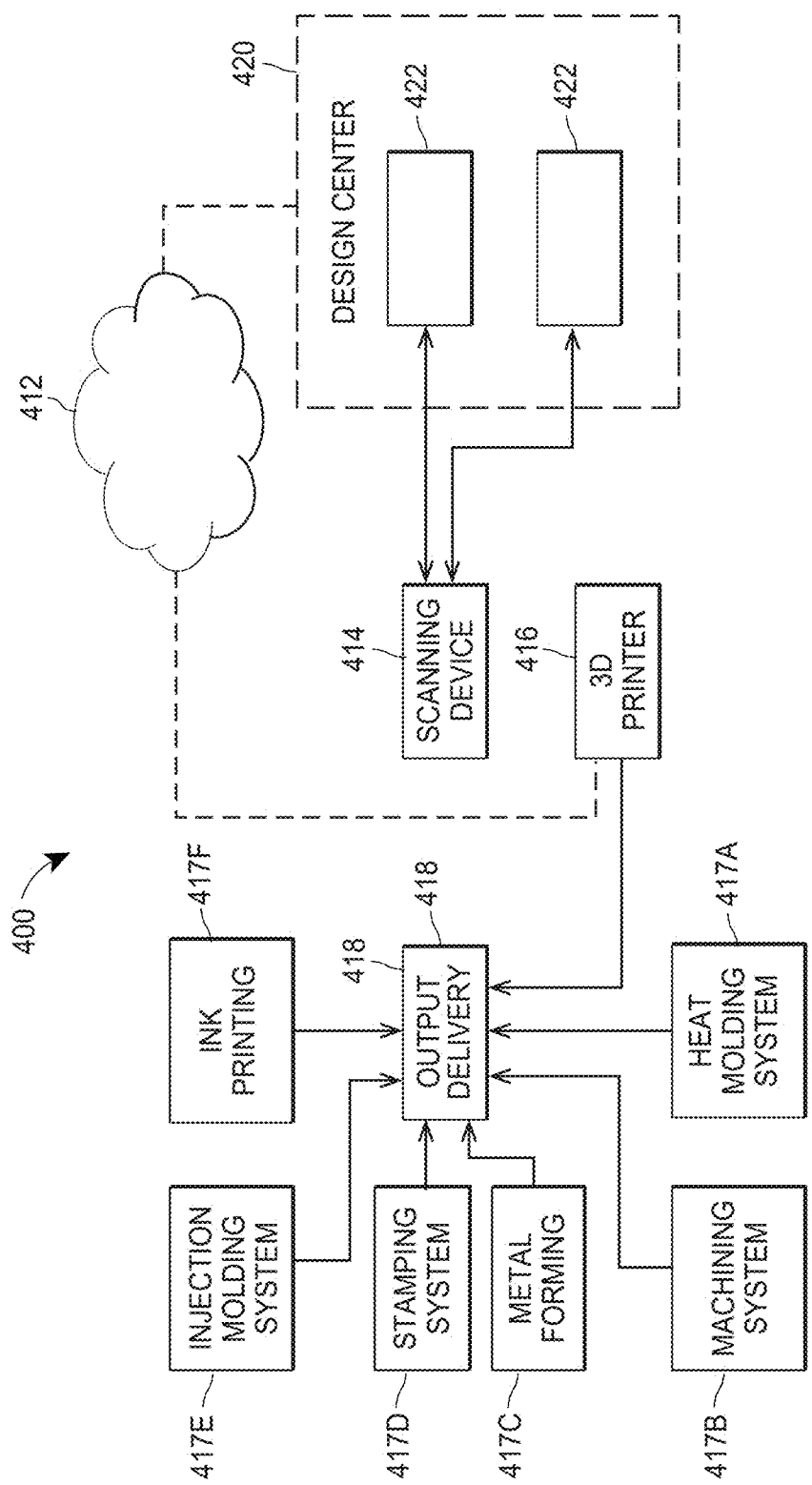
FIG. 8 is a perspective view of a system for manufacturing a smart ring according to an aspect of the present disclosure.
Figure 9:
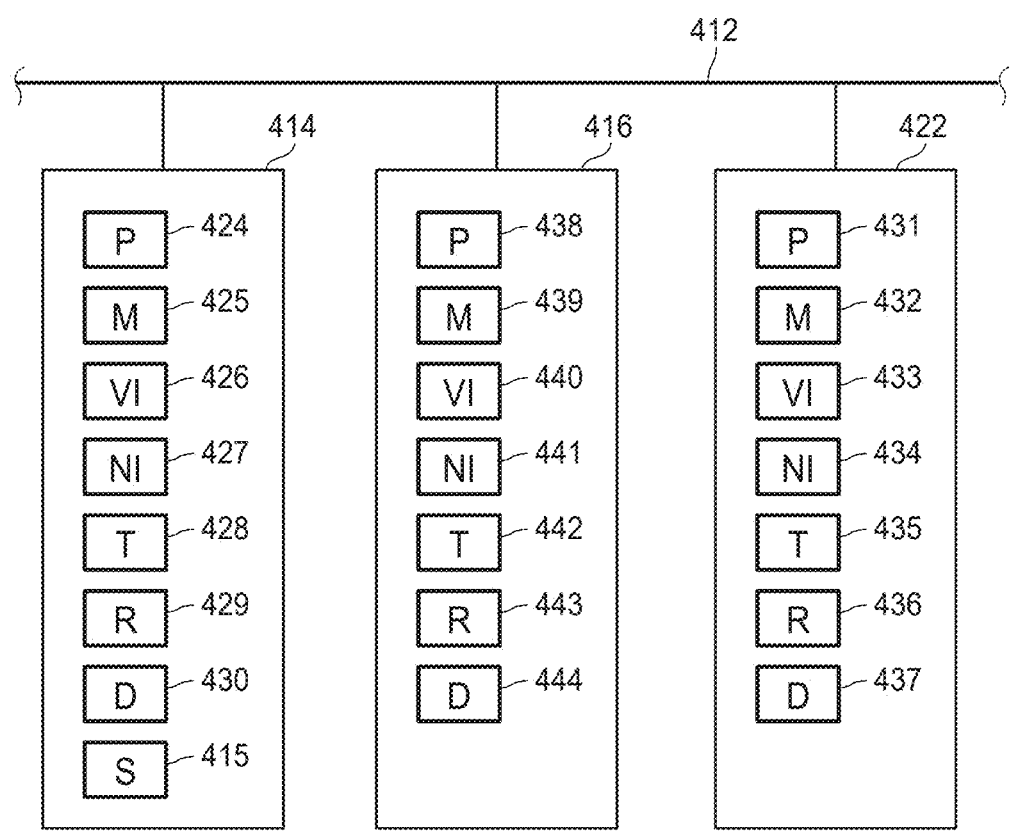
FIG. 9 is a block diagram of a portion of the system of FIG. 8 according to some embodiments.

Referring now to FIG. 8, a system 400 for manufacturing any one of the foregoing smart ring clips is depicted. The system 400 includes a communication network 412, a scanning device 414 communicatively coupled to the communication network 412, such as a wireless network, and a design system 420 also communicatively coupled to the scanning device 414 and the communication network 412, as depicted in FIG. 8. The scanning device 414 scans a user's ring to create a ring-specific scan for the smart ring clip. The scanning device 414 may include one or more various known computing devices, such as an iPad, an iPod, an iPhone or any other smart phone, tablet or other device having such scanning capabilities, for example, and may further include a volumetric capture sensor 415 (FIG. 9). The ring-specific scan is later used to make the additively manufactured smart ring clip via a 3D printer, as described more below.

The system 400 further includes a 3D printer 416, which additively manufactures the ring-specific smart ring clip, and a delivery center 418 for delivery of final and complete additively manufactured smart ring clip. The system 400 further includes the design system 420 communicatively coupled to both the scanning device 414 and the 3D printer 416. In one example, the design system 420 is communicatively coupled via the communication network 421, such as wireless network 412. As depicted, the design system 420 includes one or more computing devices 422 that may receive data corresponding to a scan of the user's ring via the scanning device 414. At least one computing device 422 of the design system 420 then sends the ring-specific design to the 3D printer 416, such as via the wireless network 412, directing the 3D printer 416 to additively manufacture one of the foregoing smart ring clips according to the ring-specific design.

Alternatively and/or additionally, the system 400 for manufacturing any one of the foregoing smart ring clips may include a heat molding system 417A, a machining system 517B, a metal forming system 517C, a stamping system 517D, an injection molding system 517E, and/or an ink printing system 517F, each of which is coupled to the output delivery center 518 for delivery of the complete smart ring clip, as depicted in FIG. 8.

Referring now to FIG. 9, in one example, the scanning device 414 includes one or more processors 424 that implement a scanning module stored in a memory 425 of the scanning device 414 to scan a ring or a portion of a ring of the user. The scanning device 414 may also include a user-input 426 and a network interface 427, which allows the scanning device 414 to be communicatively coupled to the wireless network 412, for example, and communicate with the design system 420. The scanning device 414 further includes a transmitter 428 and a receiver 429, such that the transmitter 428 transmits scanned data corresponding to the ring-specific scan (e.g., of the ring of the user) to the design system 420 for processing, as explained more below. Further, the scanning device 414 may also include a display 430 on which the scanned data corresponding to the user's ring, for example, may be displayed.

In a similar manner, the one or more computing devices 422 of the design system 420 also includes one or more processors 431 that implement a module stored in a memory, such as a memory 432 of the computing device 422, to receive and process data corresponding to the ring-specific scan from the scanning device 414. The computing device 422 may also include a user-input 433 and a network interface 434, which allows the computing device to be communicatively coupled to the wireless network 421 and communicate with both the scanning device 414 and the 3D printer 416. The design system computing device 422 may also include a transmitter 435 and a receiver 436, such that the transmitter 435 transmits processed data relative to a ring-specific scan (e.g., from the scanning device 14) to the 3D printer 416, directing the 3D printer 416 to print a smart ring clip according to the ring-specific scan. The receiver 436 receives scanning data from the scanning device 414, which is processed by one or more processors 431 of the computing device 422 and used to implement the operation of the 3D printer 416. The computing device 422 also includes a display 437, on which data, such as data from the scanning device 414 and data processed by the computing device 422, may be displayed.

Still referring to FIG. 9, the 3D printer 416 is communicatively coupled to both the scanning device 414 and the design system 420. The 3D printer 416 includes one or more processors 438 that implement a ring-specific smart ring profile created and then transmitted from the computing device 422 of the design system 420 to the 3D printer 416 and stored in a memory 439 of the 3D printer 416. The ring-specific smart ring design profile that may be stored in the memory 439 of the 3D printer 416 includes a ring-specific design protocol for execution by one or processors 438 of the 3D printer 416. The 3D printer 416 may also include a user-input 440 and a network interface 441, which also allows the 3D printer 416 to be communicatively coupled to the wireless network 421, for example. The 3D printer 416 further includes a transmitter 442, a receiver 443 for receiving data from the design system 420 relative to a ring-specific smart ring profile, for example, and a display 444, which may include or be separate from the user-input 440.

Each of the processors 424, 431, and 438 may be a general processor, a digital signal processor, ASIC, field programmable gate array, graphics processing unit, analog circuit, digital circuit, or any other known or later developed processor. The processor 424 of the scanning device 414 may operate pursuant to a profile stored in the memory 425 of the scanning device 414, for example. The memory 425, 432, 439 may be a volatile memory or a non-volatile memory. The memory 425, 432, 439 may include one or more of a read-only memory ("ROM"), random access memory ("RAM"), a flash memory, an electronic erasable program read-only memory ("EEPROM"), or other type of memory. The memory 425, 432, 439 may include an optical, magnetic (hard drive), or any other form of data storage.

In one example, the user-specific smart ring design protocol is part of the user-specific design profile stored on the memory 432, 439 and includes a set of executable instructions that controls the 3D printer 416 to print the ring-specific smart ring clip. The ring-specific smart ring clip design protocol may be stored on the memory 432, 439 as computing logic, which includes one or more routines and/or sub-routines, embodied as computer-readable instructions stored on the memory 432, 439. The processor 431, 438 can execute the logic to cause the processor 431, 438 to retrieve the profile and control the 3D printer 416 in accordance with the ring-specific smart ring clip design profile. In particular, the user-specific smart ring clip design protocol may specify, among other parameters, the size, shape and/or volume of the finger for the smart ring clip and the timing of the 3D printing.

In view of the foregoing, it will be understood that the foregoing described smart ring clips 205d and 205e may be manufactured according to the following method of manufacture. Specifically, the method is a method of manufacturing the smart ring clip 205d, 205e comprising creating the body 210f with a flexible material by one of heat molding, such as using a heat molding system 417 (FIG. 8), machining, such as using the matching system 417B, metal forming, such as using the metal forming system 417C, stamping, such as using the stamping system 417D, injection molding, such as using the injection molding system 417E, ink printing, such as using the ink printing system 417F, or additive manufacturing, using for example the 3D printer 416 (FIG. 8). The method further comprises creating the groove 212d disposed within the body 210f again by one of heat molding, machining, metal forming, stamping, injection molding, ink printing, or additive manufacturing. As explained above, the groove 212d is for receiving the portion of the ring 214d (FIG. 5), such that the portion of the ring 214d contacts the groove 212d when the smart ring clip 205d is clipped, e.g., attached to, the portion of the ring 214d. The method further comprises disposing one or more of the battery 120, the charging unit 130, the controller 140, the processor unit 142, the memory unit 144, the sensor unit 150, the user input unit 170 or the output unit 190 in or on one or more of the body 210f or the housing portion 210h separate from and coupled to the body 210f.

In another example, the method may further comprise coupling the housing portion 210h to the body 210f of the smart ring clip 205d, 205e, such as an additively manufactured body 210f of the smart ring clip 205d. The housing portion 210h may include one or more of the battery 120, the charging unit 130, the controller 140, the processor unit 142, the memory unit 144, the sensor unit 150, the user input unit 170 or the output unit 190. In another example, the method may further comprise disposing one or more of the sensor 350b, 350c or the output element 390b, 390c on the outside surface 216d of the body 210f. In yet another example, the method may further comprise disposing one or more of the sensor 350b, 350c or the output element 390b, 390c on the inside surface 215d of the body 210f.

In addition, creating the body 210f with a flexible material by one of heat molding, injection molding, ink printing, stamping, metal forming, machining, or additive manufacturing may comprise creating the body 210f with the flexible material and having one or more of a partially semi-circular shape, or a semi-circular shape. Further, creating the body 210f with flexible material by one of heating molding, injection molding, ink printing, stamping, metal forming, machining, or additive manufacturing may also comprise creating the body 210f having the first end 210f1 and the second end 210f2 and the inside surface 215d disposed between the first end and the second end 210f1, 210f2. Still further, creating the groove 212d disposed within the body 210f by one of heat molding, injection molding, ink printing, stamping, metal forming, machining, or additive manufacturing comprises creating the groove 212d extending between the first end and the second end 210f1, 210f2 along the length of the body 210f.

Several advantages of the foregoing smart ring clips will be appreciated. For example, by using the aforementioned flexible material for at least part of the body of the smart ring clip, the smart ring clip more flexibly attaches to the portion of the ring and is able to be more easily removed from the user. Further, by heat molding or additively manufacturing the foregoing smart rings, the smart ring clips are able to be customized to a user's exact ring dimensions for example, creating a better fitting smart ring clip for user comfort and satisfaction.

Examples of Other Considerations

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

The described functions may be implemented, in whole or in part, by the devices, circuits, or routines of the system 100 shown in FIG. 1. Each of the described methods may be embodied by a set of circuits that are permanently or semi-permanently configured (e.g., an ASIC or FPGA) to perform logical functions of the respective method or that are at least temporarily configured (e.g., one or more processors and a set instructions or routines, representing the logical functions, saved to a memory) to perform the logical functions of the respective method.

While the present disclosure has been described with reference to specific examples, which are intended to be illustrative only and not to be limiting of the present disclosure, it will be apparent to those of ordinary skill in the art that changes, additions or deletions may be made to the disclosed embodiments without departing from the spirit and scope of the present disclosure.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification may not be all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements may not be limited to only those elements but may include other elements not expressly listed or inherent to such process, method, article, or apparatus. Further, unless expressly stated to the contrary, "or" refers to an inclusive "or" and not to an exclusive "or." For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. Generally speaking, when a system or technique is described as including "a" part or "a" step, the system or technique should be read to include one or at least one part or step. Said another way, for example, a system described as including a blue widget may include multiple blue widgets in some implementations (unless the description makes clear that the system includes only one blue widget).

Throughout this specification, some of the following terms and phrases are used.

Communication Interface according to some embodiments: Some of the described devices or systems include a "communication interface" (sometimes referred to as a "network interface"). A communication interface enables the system to send information to other systems and to receive information from other systems, and may include circuitry for wired or wireless communication.

Each described communication interface or communications unit (e.g., communications unit 160) may enable the device of which it is a part to connect to components or to other computing systems or servers via any suitable network, such as a personal area network (PAN), a local area network (LAN), or a wide area network (WAN). In particular, the communication unit 160 may include circuitry for wirelessly connecting the smart ring 101 to the user device 104 or the network 105 in accordance with protocols and standards for NFC (operating in the 13.56 MHz band), RFID (operating in frequency bands of 125-134 kHz, 13.56 MHz, or 856 MHz to 960 MHz), Bluetooth (operating in a band of 2.4 to 2.485 GHz), Wi-Fi Direct (operating in a band of 2.4 GHz or 5 GHz), or any other suitable communications protocol or standard that enables wireless communication.

Communication Link according to some embodiments: A "communication link" or "link" is a pathway or medium connecting two or more nodes. A link between two end-nodes may include one or more sublinks coupled together via one or more intermediary nodes. A link may be a physical link or a logical link. A physical link is the interface or medium(s) over which information is transferred, and may be wired or wireless in nature. Examples of physicals links may include a cable with a conductor for transmission of electrical energy, a fiber optic connection for transmission of light, or a wireless electromagnetic signal that carries information via changes made to one or more properties of an electromagnetic wave(s).

A logical link between two or more nodes represents an abstraction of the underlying physical links or intermediary nodes connecting the two or more nodes. For example, two or more nodes may be logically coupled via a logical link. The logical link may be established via any combination of physical links and intermediary nodes (e.g., routers, switches, or other networking equipment).

A link is sometimes referred to as a "communication channel." In a wireless communication system, the term "communication channel" (or just "channel") generally refers to a particular frequency or frequency band. A carrier signal (or carrier wave) may be transmitted at the particular frequency or within the particular frequency band of the channel. In some instances, multiple signals may be transmitted over a single band/channel. For example, signals may sometimes be simultaneously transmitted over a single band/channel via different sub-bands or sub-channels. As another example, signals may sometimes be transmitted via the same band by allocating time slots over which respective transmitters and receivers use the band in question.

Memory and Computer-Readable Media according to some embodiments: Generally speaking, as used herein the phrase "memory" or "memory device" refers to a system or device (e.g., the memory unit 144) including computer-readable media ("CRM"). "CRM" refers to a medium or media accessible by the relevant computing system for placing, keeping, or retrieving information (e.g., data, computer-readable instructions, program modules, applications, routines, etc.). Note, "CRM" refers to media that is non-transitory in nature, and does not refer to disembodied transitory signals, such as radio waves.

The CRM may be implemented in any technology, device, or group of devices included in the relevant computing system or in communication with the relevant computing system. The CRM may include volatile or nonvolatile media, and removable or non-removable media. The CRM may include, but is not limited to, RAM, ROM, EEPROM, flash memory, or other memory technology, CD-ROM, digital versatile disks (DVD) or other optical disk storage, magnetic cassettes, magnetic tape, magnetic disk storage or other magnetic storage devices, or any other medium which can be used to store information, and which can be accessed by the computing system. The CRM may be communicatively coupled to a system bus, enabling communication between the CRM and other systems or components coupled to the system bus. In some implementations the CRM may be coupled to the system bus via a memory interface (e.g., a memory controller). A memory interface is circuitry that manages the flow of data between the CRM and the system bus.

Network according to some embodiments: As used herein and unless otherwise specified, when used in the context of system(s) or device(s) that communicate information or data, the term "network" (e.g., the networks 105 and 440) refers to a collection of nodes (e.g., devices or systems capable of sending, receiving or forwarding information) and links which are connected to enable telecommunication between the nodes.

Each of the described networks may include dedicated routers responsible for directing traffic between nodes, and, optionally, dedicated devices responsible for configuring and managing the network. Some or all of the nodes may be also configured to function as routers in order to direct traffic sent between other network devices. Network devices may be inter-connected in a wired or wireless manner, and network devices may have different routing and transfer capabilities. For example, dedicated routers may be capable of high volume transmissions while some nodes may be capable of sending and receiving relatively little traffic over the same period of time. Additionally, the connections between nodes on a network may have different throughput capabilities and different attenuation characteristics. A fiberoptic cable, for example, may be capable of providing a bandwidth several orders of magnitude higher than a wireless link because of the difference in the inherent physical limitations of the medium. If desired, each described network may include networks or sub-networks, such as a local area network (LAN) or a wide area network (WAN).

Node according to some embodiments: Generally speaking, the term "node" refers to a connection point, redistribution point, or a communication endpoint. A node may be any device or system (e.g., a computer system) capable of sending, receiving or forwarding information. For example, end-devices or end-systems that originate or ultimately receive a message are nodes. Intermediary devices that receive and forward the message (e.g., between two end-devices) are also generally considered to be "nodes."

Processor according to some embodiments: The various operations of example methods described herein may be performed, at least partially, by one or more processors (e.g., the one or more processors in the processor unit 142). Generally speaking, the terms "processor" and "microprocessor" are used interchangeably, each referring to a computer processor configured to fetch and execute instructions stored to memory. By executing these instructions, the processor(s) can carry out various operations or functions defined by the instructions. The processor(s) may be temporarily configured (e.g., by instructions or software) or permanently configured to perform the relevant operations or functions (e.g., a processor for an Application Specific Integrated Circuit, or ASIC), depending on the particular embodiment. A processor may be part of a chipset, which may also include, for example, a memory controller or an I/O controller. A chipset is a collection of electronic components in an integrated circuit that is typically configured to provide I/O and memory management functions as well as a plurality of general purpose or special purpose registers, timers, etc. Generally speaking, one or more of the described processors may be communicatively coupled to other components (such as memory devices and I/O devices) via a system bus.

The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A smart ring clip comprising:
a body, comprising a curved shape;
a groove disposed within the body of the smart ring clip and extending along a curved length of the body of the smart ring clip between a first end and a second end of the smart ring clip, wherein the groove is configured for:
receiving a conventionally shaped enclosed ring, wherein:
the body of the smart ring clip includes a flexible material configured to be secured to the ring by the groove; and
the body of the smart ring clip is removable from the ring upon movement of the body of the smart ring clip in a direction away from the ring;
a charging unit;
a user input unit configured to collect information from a user and disposed at an outside surface of the body of the smart ring clip; and
a sensor disposed at a portion of the outside surface of the smart ring clip, wherein a first portion of the outside surface comprises a location:
outside of the rounded groove of the smart ring clip; and
not configured to contact a finger of the user when the smart ring clip is coupled to the ring and the ring is worn on the finger of the user, wherein a first portion of an inside surface of the smart ring clip is located at an opposite side of the smart ring clip from the first portion of the outside surface and is configured to contact the finger of the user when the smart ring clip is coupled to the ring and when the ring is worn on the finger of the user.

2. The smart ring clip of claim 1, wherein the user input unit further includes a button.

3. The smart ring clip of claim 1, wherein the outside surface of the smart ring clip further comprises an output element.

4. The smart ring clip of claim 1, wherein the body of the smart ring clip comprises a semi-circular shape.

5. The smart ring clip of claim 1, wherein the inside surface of the smart ring clip further comprises a sensor.

6. The smart ring clip of claim 5, wherein the sensor disposed at the portion of the outside surface of the smart ring clip comprises an inertial motion unit.

7. The smart ring clip of claim 1, wherein the body of the smart ring clip comprises an electric sensor fabric material.

8. The smart ring clip of claim 1, wherein the body of the smart ring clip includes a silicone material configured to function as one or more of an artificial muscle or a nerve, and wherein the silicone material is capable of generating electricity or sensing pressure.

9. The smart ring clip of claim 1, wherein the body of the smart ring clip is one or more of additively manufactured or heat molded to conform to a shape of the ring of the user, and wherein the shape of the ring is obtained by scanning or photographing the ring.

10. The smart ring clip of claim 1, wherein the outside surface of the smart ring clip further includes a display.

11. The smart ring clip of claim 1, wherein the body of the smart ring clip is one or more of additively manufactured or heat molded to conform to a shape of a ring of the user, and wherein the shape of the ring is obtained by a mold indicative of the shape of the ring of the user to which the smart ring clip will be attached.

12. The smart ring clip of claim 1, wherein the ring is configured to contact simultaneously the finger of the user and the smart ring clip.

13. The smart ring clip of claim 1, wherein the user input unit comprises one or more of a microphone or a touch sensor.

14. The smart ring clip of claim 1, wherein the user input unit further comprises a button.

15. A method of manufacturing a smart ring clip, the method comprising:
creating a body of the smart ring clip with a flexible material by one or more of heat molding, injection molding, ink printing, stamping, metal forming, machining, or additive manufacturing;
creating a groove disposed within the body of the smart ring clip and extending along a curved length of the body of the smart ring clip between a first end and a second end of the smart ring clip, wherein the groove is configured to:
receive a ring that is conventionally shaped enclosed ring,
wherein:
the body of the smart ring clip comprises a curved shape; and
the body of the smart ring clip is removable from the ring upon movement of the body of the smart ring clip in a direction away from the ring;
providing a charging unit;
disposing a user input unit configured to collect information from a user and disposed at an outside surface of the body of the smart ring clip; and
disposing a sensor at a first portion of the outside surface of the smart ring clip, wherein the first portion of the outside surface comprises a location:
outside of the groove of the smart ring clip; and
not configured to contact a finger of the user when the smart ring clip is coupled to the ring and the ring is worn on the finger of the user, wherein a first portion of an inside surface of the smart ring clip is located at an opposite side of the smart ring clip from the first portion of the outside surface and is configured to contact the finger of the user when the smart ring clip is coupled to the ring and when the ring is worn on the finger of the user.

16. The method of claim 15, wherein creating the body of the smart ring clip with the flexible material by one or more of heat molding, injection molding, ink printing, stamping, metal forming, machining, or additive manufacturing comprises creating the body by additive manufacturing, and wherein the method further comprises coupling a housing portion to the body of the smart ring clip, and wherein the housing portion comprises one or more of a battery, a processing unit, a communication unit, a memory unit, or a second sensor.

17. The method of claim 15, further comprising disposing a sensor on the inside surface of the smart ring clip.

18. The method of claim 15, further comprising disposing an output element on the outside surface of the smart ring clip.

19. The method of claim 15, wherein creating the body of the smart ring clip with the flexible material by one or more of heat molding, injection molding, ink printing, stamping, metal forming, machining, or additive manufacturing comprises creating the body of the smart ring clip with a semi-circular shape.

20. The method of claim 15, wherein creating the body of the smart ring clip with the flexible material by one or more of heat molding, injection molding, ink printing, stamping, metal forming, machining, or additive manufacturing comprises creating the body of the smart ring clip having the inside surface with the groove disposed between the first end and the second end of the smart ring clip.

21. The method of claim 20, wherein creating the body of the smart ring clip with the flexible material by one or more of heat molding, injection molding, ink printing, stamping, metal forming, machining, or additive manufacturing comprises creating the groove extending between the first end and the second end along the curved length of the body of the smart ring clip.

22. The method of claim 15, wherein the body of the smart ring clip is additively manufactured, and wherein the body is removably coupled to a housing portion, and wherein the housing portion comprises one or more of a battery, a processing unit, a communication unit, or a memory unit.

23. The method of claim 15, wherein creating the body of the smart ring clip with the flexible material by one or more of heat molding, injection molding, ink printing, stamping, metal forming, machining, or additive manufacturing comprises creating the body of the smart ring clip with the flexible material to have a partially semi-circular shape.

24. The method of claim 15, further comprising:
   disposing a display on the outside surface of the smart ring clip.

* * * * *